US008285303B2

(12) United States Patent
Imae

(10) Patent No.: US 8,285,303 B2
(45) Date of Patent: Oct. 9, 2012

(54) AREA SPECIFYING APPARATUS, COMMUNICATION SYSTEM, AND AREA SPECIFYING METHOD

(75) Inventor: Nozomi Imae, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 557 days.

(21) Appl. No.: 12/577,386

(22) Filed: Oct. 12, 2009

(65) Prior Publication Data

US 2010/0097643 A1 Apr. 22, 2010

(30) Foreign Application Priority Data

Oct. 21, 2008 (JP) ................................. 2008-271170
Aug. 18, 2009 (JP) ................................. 2009-189267

(51) Int. Cl.
*H04W 24/00* (2009.01)

(52) U.S. Cl. .................. 455/456.1; 455/550.1

(58) Field of Classification Search ............... 455/550.1, 455/456
See application file for complete search history.

(56) References Cited

U.S. PATENT DOCUMENTS 7,349,544 B2* 3/2008 Tiwari ........................... 380/277

2003/0134645 A1* 7/2003 Stern et al. .................... 455/456
2008/0311957 A1* 12/2008 Jantunen et al. .............. 455/560

FOREIGN PATENT DOCUMENTS

| JP | 2004-153736 | 5/2004 |
| JP | 2006-135553 | 5/2006 |
| JP | 2008-199422 | 8/2008 |

* cited by examiner

*Primary Examiner* — Vladimir Magloire
(74) *Attorney, Agent, or Firm* — Oblon, Spivak, McClelland, Maier & Neustadt, L.L.P.

(57) ABSTRACT

An area specifying apparatus, which is portable, includes a position acquiring unit that acquires positions of respective radio communication apparatuses through radio communication therewith, a distance measuring unit that measures distances from the area specifying apparatus to the respective radio communication apparatuses while the area specifying apparatus is being moved, a position calculating unit that calculates positions of the area specifying apparatus based on three or more of the positions of the respective radio communication apparatuses and corresponding three or more of the distances from the area specifying apparatus to the respective radio communication apparatuses, and a position transmitting unit that transmits the positions of the area specifying apparatus to each of the radio communication apparatuses so that each of the radio communication apparatuses can specify a physical area enclosed by a line connecting the positions of the area specifying apparatus as a specified area.

16 Claims, 20 Drawing Sheets

AREA SPECIFYING APPARATUS, COMMUNICATION SYSTEM, AND AREA SPECIFYING METHOD

CROSS-REFERENCE TO RELATED APPLICATIONS

The present application claims priority to and incorporates by reference the entire contents of Japanese Patent Application No. 2008-271170 filed in Japan on Oct. 21, 2008 and Japanese Patent Application No. 2009-189267 filed in Japan on Aug. 18, 2009.

BACKGROUND OF THE INVENTION

1. Field of the Invention

The present invention relates to a technology for specifying a physical area for which communication control is performed.

2. Description of the Related Art

Japanese Patent Application Laid-open No. 2008-199422 discloses a technology for specifying a physical area for which communication control is performed. More specifically, a plurality of area specifying apparatuses, e.g., markers, are installed at designated locations to specify such a physical area.

However, in the technology mentioned above, a plurality of the markers are necessary for specifying the physical area, so that there has been a problem that costs for the markers increase and space for installing the markers need to be assured.

SUMMARY OF THE INVENTION

It is an object of the present invention to at least partially solve the problems in the conventional technology.

According to an aspect of the present invention there is provided an area specifying apparatus that is portable, the area specifying apparatus including a position acquiring unit that acquires positions of respective radio communication apparatuses through radio communication therewith; a distance measuring unit that measures distances from the area specifying apparatus to the respective radio communication apparatuses while the area specifying apparatus is being moved; a position calculating unit that calculates positions of the area specifying apparatus based on three or more of the positions of the respective radio communication apparatuses and corresponding three or more of the distances from the area specifying apparatus to the respective radio communication apparatuses; and a position transmitting unit that transmits the positions of the area specifying apparatus to each of the radio communication apparatuses so that each of the radio communication apparatuses can specify a physical area enclosed by a line connecting the positions of the area specifying apparatus as a specified area.

According to another aspect of the present invention there is provided a communication system including an area specifying apparatus that is portable; and a plurality of radio communication apparatuses each capable of communicating with the area specifying apparatus, wherein the area specifying apparatus includes a position acquiring unit that acquires positions of respective radio communication apparatuses through radio communication therewith; a distance measuring unit that measures distances to the respective radio communication apparatuses while the area specifying apparatus is being moved; a position calculating unit that calculates positions of the area specifying apparatus based on three or more of the positions of the respective radio communication apparatuses and corresponding three or more distances from the area specifying apparatus to the respective radio communication apparatuses; and a position transmitting unit that transmits the positions of the area specifying apparatus to each of the radio communication apparatuses, and each of the radio communication apparatuses includes an area specifying unit that receives the positions of the area specifying apparatus and specifies a physical area enclosed by a line connecting the positions of the area specifying apparatus as a specified area.

According to still another aspect of the present invention there is provided an area specifying method for an area specifying apparatus that is portable, the method including acquiring positions of respective radio communication apparatuses through radio communication therewith; measuring distances from the area specifying apparatus to the respective radio communication apparatuses while the area specifying apparatus is being moved; calculating positions of the area specifying apparatus based on three or more of the positions of the respective radio communication apparatuses and corresponding three or more of the distances from the area specifying apparatus to the respective radio communication apparatuses; and transmitting the positions of the area specifying apparatus to each of the radio communication apparatuses so that each of the radio communication apparatuses can specify a physical area enclosed by a line connecting the positions of the area specifying apparatus as a specified area.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
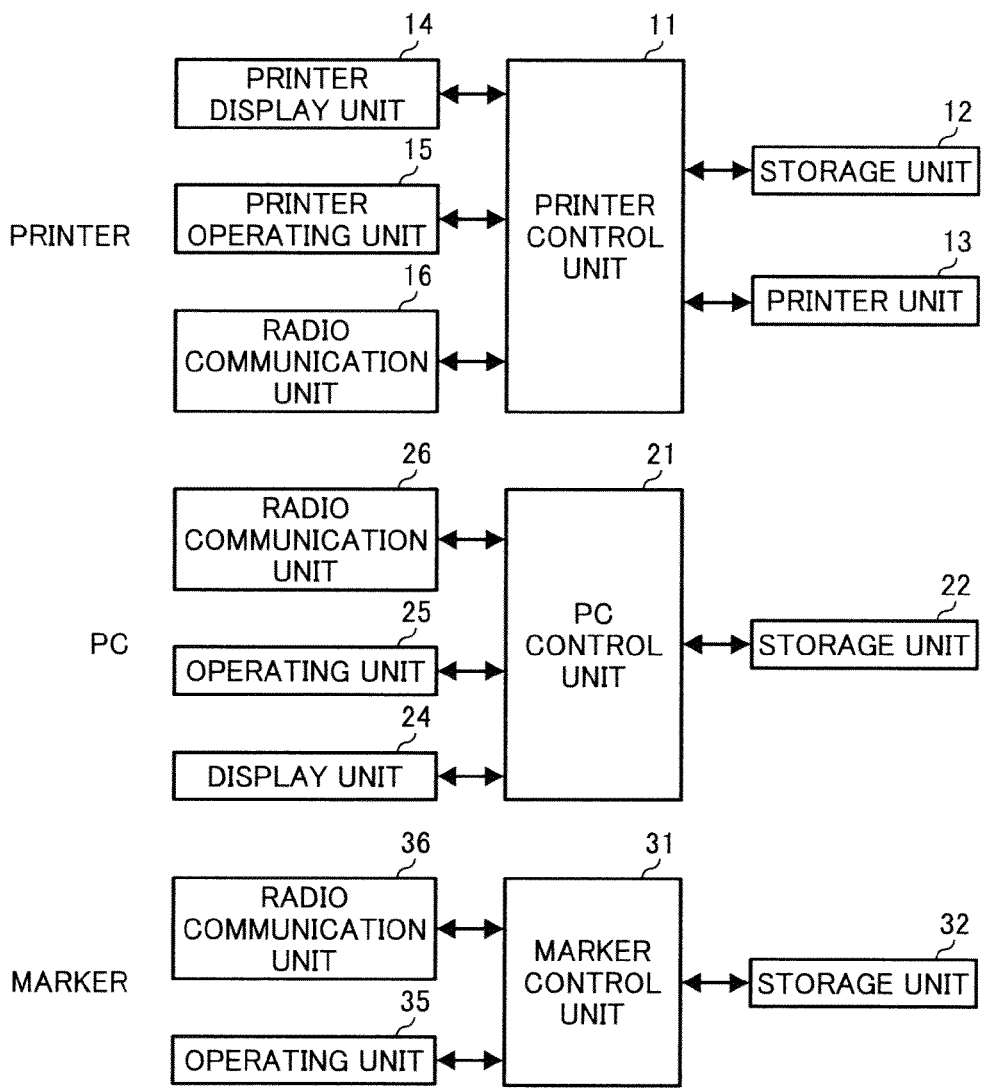
FIG. 1 is a block diagram of a printer, a personal computer (PC), and a marker of a communication system according to a first embodiment of the present invention.

Exemplary embodiments of the present invention are explained in detail below with reference to the accompanying drawings.

A communication system according to a first embodiment of the present invention includes a plurality of radio communication apparatuses and one area specifying device. In the following embodiments, personal computers (PCs) and printers (PRN in the drawings) are described as examples of the radio communication apparatuses of the present invention. However, the present invention is not limited to the PCs and the printers. For example, the radio communication apparatus can be a multifunction peripheral (MFP) having at least two functions from among a copy function, a print function, a scan function, and a facsimile (FAX) function, a copier, a FAX machine, and the like.

In the following embodiments, a marker that is a portable terminal capable of communicating with other terminals (e.g., other devices) is described as an example of the area specifying device that specifies a predetermined physical area. However, the present invention is not limited to the marker. For example, the area specifying device can be any portable communication terminals (i.e., mobile communication terminals) that can be easily carried by a person. Examples of the portable communication terminals include general mobile phones and PCs.

FIG. 1 is a block diagram of a printer, a PC, and a marker of a communication system according to a first embodiment of the present invention. Exemplary configurations of the printer, the PC, and the marker are described below. In the communication system of the first embodiment, positions of the printer and the PC are calculated while the marker is being moved and positions of the marker (hereinafter, "a marker position") are also calculated based on a distance to each of the printer and the PC according to movement of the marker so that an area enclosed by calculated marker positions can be specified. When the area specified in the above-mentioned manner (hereinafter, "specified area") is set as an area where a communication is allowed, it is possible to detect terminals that can communicate with the PC and the like in the specified area.

As shown in FIG. 1, the printer of the first embodiment mainly includes a printer control unit 11, a printer display unit 14, a printer operating unit 15, a radio communication unit 16, a storage unit 12, and a printer unit 13.

The printer display unit 14 displays thereon information and the like for a user. The printer operating unit 15 receives operation from a user. The radio communication unit 16 performs radio communication according to a communication method using a WiMedia™-based physical layer that can measure a distance to a communication destination with high accuracy. The storage unit 12 stores therein various information necessary for controlling the printer. The printer unit 13 performs printing on a sheet and the like. The printer control unit 11 controls the printer display unit 14, the printer operating unit 15, the radio communication unit 16, the storage unit 12, and the printer unit 13.

The PC of the first embodiment mainly includes, as shown in FIG. 1, a PC control unit 21, a radio communication unit 26, an operating unit 25, a display unit 24, and a storage unit 22.

The radio communication unit 26 performs radio communication according to a communication method using a WiMedia™-based physical layer that can measure a distance to a communication destination with high accuracy. The operating unit 25 receives operation from a user. The display unit 24 displays thereon information and the like for a user. The storage unit 22 stores therein various information necessary for controlling the PC. The PC control unit 21 controls the radio communication unit 26, the operating unit 25, the display unit 24, and the storage unit 22.

The marker of the first embodiment mainly includes, as shown in FIG. 1, a marker control unit 31, a radio communication unit 36, an operating unit 35, and a storage unit 32.

The radio communication unit 36 performs radio communication according to a communication method using a WiMedia™-based physical layer that can measure a distance to a communication destination with high accuracy. The operating unit 35 receives operation from a user. The storage unit 32 stores therein various information necessary for controlling the marker. The marker control unit 31 controls the radio communication unit 36, the operating unit 35, and the storage unit 32.

Figure 2:
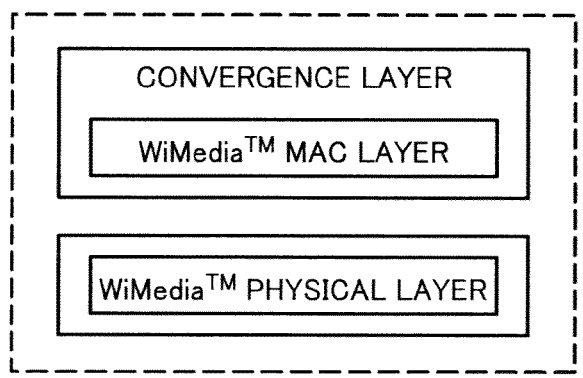
FIG. 2 is a block diagram of an exemplary WiMedia™-based protocol stack.

FIG. 2 is a block diagram of an exemplary WiMedia™-based protocol stack. A scheme for measuring a distance is contained in a WiMedia™ layer. An upper-layer protocol used in a layer above the WiMedia™ layer is not necessary for measuring the distance. In other words, even if the marker has only a function corresponding to WiMedia™ layers enclosed by a dashed line of FIG. 2, the marker can measure the distance.

When the marker is equipped with only the function corresponding to the WiMedia™ layers enclosed by the dashed line of FIG. 2, the marker can reduce power consumption thereof and can operate by batteries. Because the marker can operate by batteries, the marker can be used even in a location where alternative-current (AC) power is not available. Furthermore, by configuring the marker to have only the function corresponding to the WiMedia™ layers enclosed by the dashed line of FIG. 2, functions of the marker can be limited, resulting in cost reduction.

The specification of WiMedia™ is disclosed in, for example, European standard specification ECMA-368 defined by ECMA-International (European association for standardizing information and communication systems). More specifically, a distance to a communication destination can be measured according to a method disclosed in chapter 14 "Ranging and location awareness" of ECMA-368. Examples of a communication method that employs a WiMedia™-based physical layer include a wireless USB (registered trademark), a wireless IEEE 1394 (Institute of Electrical and Electronics Engineers), next-generation Bluetooth (registered trademark), and a Winet. The above-mentioned communication method using a WiMedia™-based physical layer employs short pulses, so that the distance can be measured more accurately than a conventionally-known communication method.

Figure 3A:
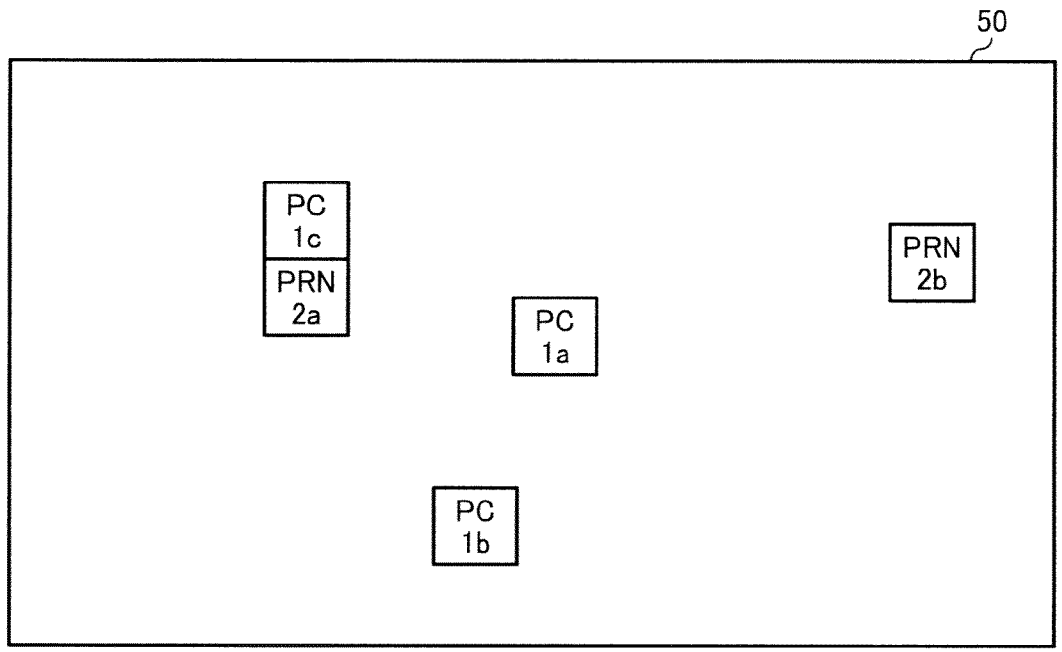
FIGS. 3A and 3B are schematic diagrams for explaining exemplary structures of the communication system according to the first embodiment.

FIG. 3A is a schematic diagram for explaining an exemplary structure of the communication system according to the first embodiment. Assuming that a plurality of PCs 1*a*, 1*b*, 1*c* and printers 2*a*, 2*b* are located in a room 50, the communication system of the first embodiment specifies a predetermined area in the room 50 based on a movement of the marker. In the following descriptions, an arbitrary one of the PCs 1*a* to 1*c* is simply referred to as a PC 1, and an arbitrary one of the printers 2*a* and 2*b* is simply referred to as a printer 2, as appropriate.

Figure 3B:
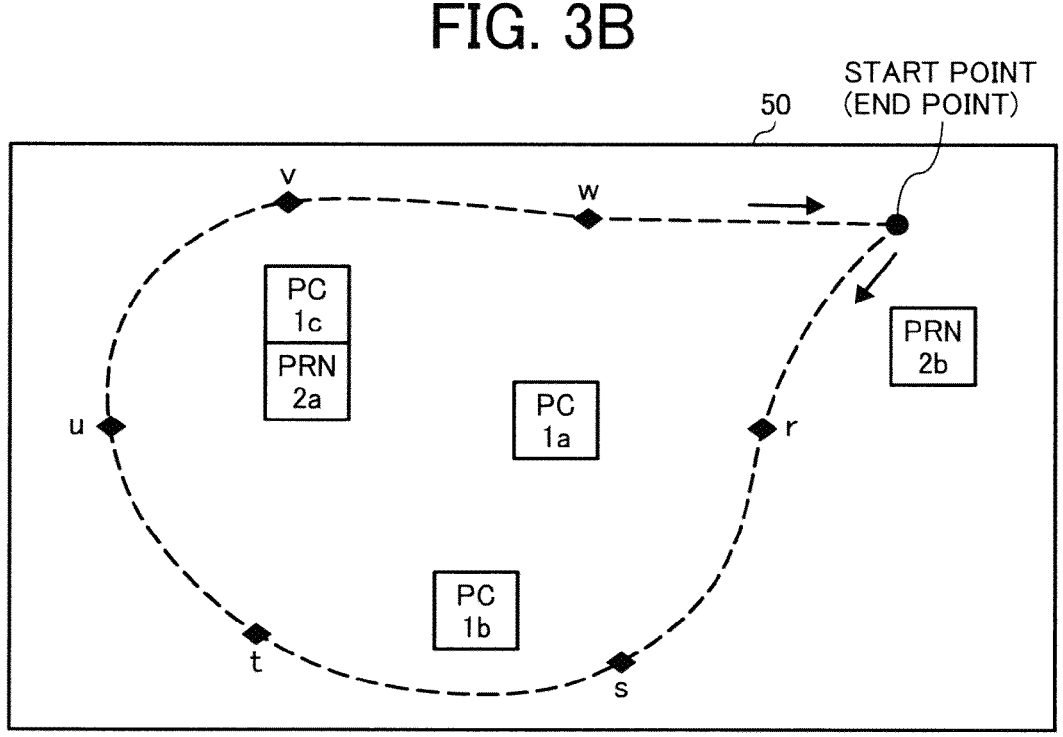
Figure 4:
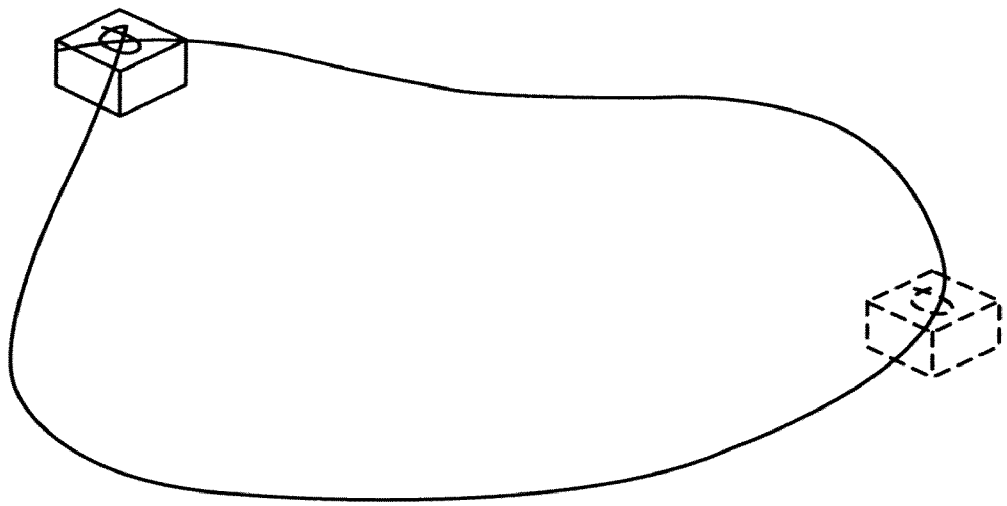
FIG. 4 is a schematic diagram of an exemplary curved area (a movement locus of the marker) specified by the marker shown in FIG. 1.

When a user carrying the marker moves along a boundary of an area that the user is to specify, a movement locus of the marker, such as a curve as shown in FIG. 4, is obtained. FIG. 3B is a schematic diagram for explaining an area specification in the room 50. In FIG. 3B, a dashed curve indicates the movement locus of the marker, and an area enclosed by the curve corresponds to an area specified by the user. In the example shown in FIG. 3B, the area specification is started from a start point and ended at the start point after movement along the dashed line.

Figure 5:
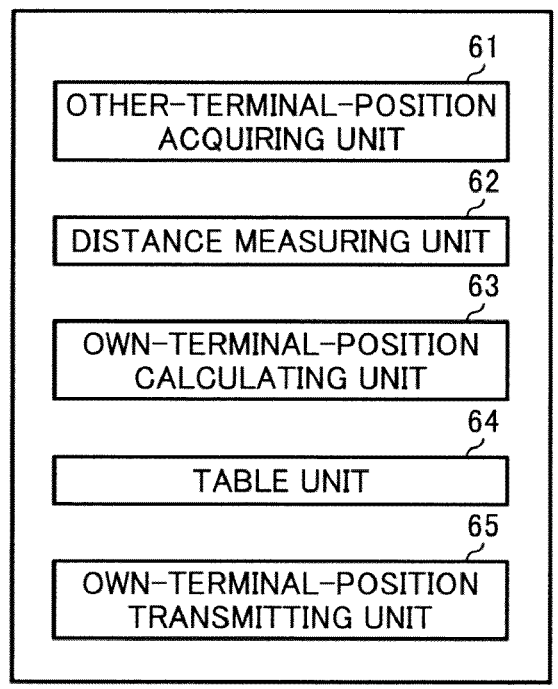
FIG. 5 is a functional block diagram for explaining exemplary processing implemented by the marker shown in FIG. 1.

FIG. 5 is a functional block diagram for explaining exemplary processing implemented by the marker. Units in a processing block diagram of FIG. 5 are implemented by the marker having the configuration shown in FIG. 1. The marker shown in FIG. 5 functions as an other-terminal-position acquiring unit 61, a distance measuring unit 62, an own-terminal-position calculating unit 63, a table unit 64, and an own-terminal-position transmitting unit 65.

The other-terminal-position acquiring unit 61 performs radio communication with each of the PCs 1*a* to 1*c* and the printers 2*a* and 2*b*, and acquires position (i.e., positional information representing a coordinate) that is set in advance in each of the PCs 1*a* to 1*c* and the printers 2*a* and 2*b*. The PCs 1*a* to 1*c* and the printers 2*a* and 2*b* function as "other terminals" for the marker.

The distance measuring unit 62 measures a distance to each of the PCs 1*a* to 1*c* and the printers 2*a* and 2*b* by using the WiMedia™-based protocol that can measure a distance to a communication destination with high accuracy. The distance measuring unit 62 also measures a movement distance of an own terminal (i.e., the marker) from a certain point to a certain point by using the WiMedia™-based protocol.

The own-terminal-position calculating unit 63 calculates a position (a coordinate) of the own terminal (hereinafter, referred to as "an own terminal position" as appropriate) by solving simultaneous equations based on at least three positions of three respective other terminals (hereinafter, referred to as "other terminal positions" as appropriate) acquired by the other-terminal-position acquiring unit 61 and distances to the three respective other terminals measured by the distance measuring unit 62. More specifically, the own-terminal-position calculating unit 63 assigns, in the following Equations (1) to (3), a position (x1, y1) of other terminal A (i.e., other terminal position A), a position (x2, y2) of other terminal B (i.e., other terminal position B), and a position (x3, y3) of other terminal C (i.e., other terminal position C), which are acquired by the other-terminal-position acquiring unit 61; and a distance L1 from the own terminal to the other terminal A, a distance L2 from the own terminal to the other terminal B, and a distance C from the own terminal to the other terminal C, which are measured by the distance measuring unit 62. Then, the own-terminal-position calculating unit 63 calculates a set of Equations (1) to (3) to obtain the own terminal position (X, Y).

$$L1=((X-x1)^2+(Y-y1)^2)^{1/2} \quad (1)$$

$$L2=((X-x2)^2+(Y-y2)^2)^{1/2} \quad (2)$$

$$L3=((X-x3)^2+(Y-y3)^2)^{1/2} \quad (3)$$

where (X, Y) is the own terminal position, (x1, y1) is the other terminal position A, (x2, y2) is the other terminal position B, (x3, y3) is the other terminal position C, L1 is the distance from the own terminal to the other terminal A, L2 is the distance from the own terminal to the other terminal B, and L3 is the distance from the own terminal to the other terminal C.

Figure 6:
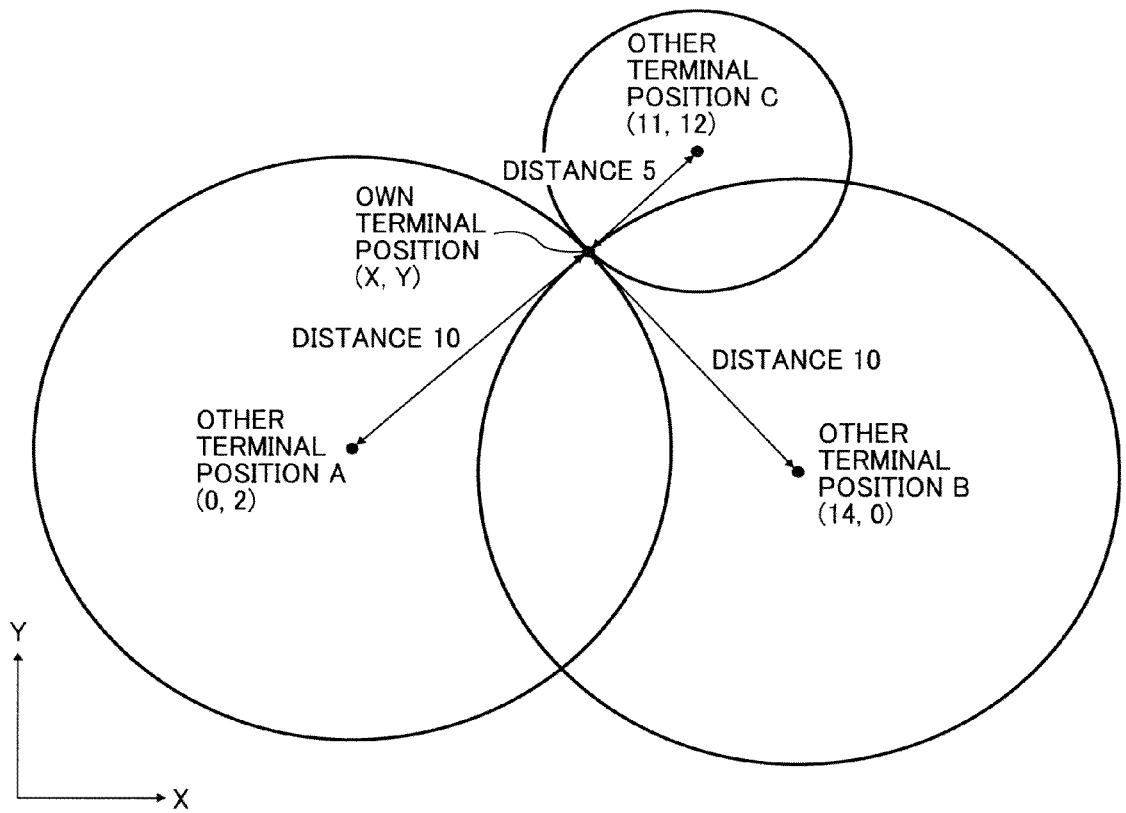
FIG. 6 is a schematic diagram for explaining processing performed by an own-terminal-position calculating unit shown in FIG. 5.

FIG. 6 is a schematic diagram for explaining processing performed by the own-terminal-position calculating unit 63. In the example shown in FIG. 6, it is assumed that the other-terminal-position acquiring unit 61 has acquired three other terminal positions, that is, the other terminal position A (0, 2), the other terminal position B (14, 0), and the other terminal position C (11, 12). Furthermore, in FIG. 6, it is assumed that a distance from the own terminal position (X, Y) to the other terminal position A (0, 2) is 10, to the other terminal position B (14, 0) is 10, and to the other terminal position B (11, 12) is 5.

In this case, the own-terminal-position calculating unit 63 assigns the above coordinates and distances to Equations (1) to (3) as described above, and then solves a set of the following resultant Equations (4) to (6) to obtain the own terminal position (X, Y).

$$10=((X-0)^2+(Y-2)^2)^{1/2} \quad (4)$$

$$10=((X-14)^2+(Y-0)^2)^{1/2} \quad (5)$$

$$5=((X-11)^2+(Y-12)^2)^{1/2} \quad (6)$$

Thus, the own-terminal-position calculating unit 63 needs to acquire three or more positions of respective three or more other terminals and three or more distances to the same three or more other terminals to calculate the own terminal position.

The table unit 64 is a storage medium for storing, as positional information, the other terminal positions acquired by the other-terminal-position acquiring unit 61 and the own terminal position calculated by the own-terminal-position calculating unit 63.

The own-terminal-position transmitting unit 65 transmits the own terminal position that is calculated by the own-terminal-position calculating unit 63 or stored in the table unit 64 to each of the other terminals.

Figure 7:
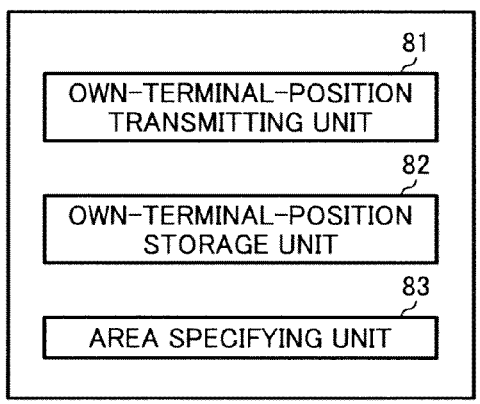
FIG. 7 is a functional block diagram for explaining exemplary processing implemented by the PC and the printer shown in FIG. 1.

FIG. 7 is a functional block diagram for explaining exemplary processing implemented by the PC shown in FIG. 1. Units in a processing block diagram of FIG. 7 are implemented by the PC shown in FIG. 1. The PC shown in FIG. 7 functions as an own-terminal-position transmitting unit 81, an own-terminal-position storage unit 82, and an area specifying unit 83.

The own-terminal-position storage unit 82 stores therein an own terminal position (a coordinate) that is set in advance. In the first embodiment, it is assumed that the own terminal position (a coordinate) is set in advance in each of the PCs 1a to 1c and the printers 2a and 2b. The own terminal position normally corresponds to a position where each of the PCs 1a to 1c and the printers 2a and 2b is located.

The own-terminal-position transmitting unit 81 performs radio communication with the marker to transmit to the marker the own terminal position that is set in advance.

The area specifying unit 83 receives a plurality of the marker positions from the marker and employs the received marker positions as a boundary to thereby specify an area enclosed by the received marker positions as a specified area. More specifically, the area specifying unit 83 determines the specified area by associating the marker positions with identification information for identifying the specified area. The specified area is set as a terminal-to-terminal communication allowed area in which communication between terminals is allowed, a terminal-to-terminal communication prohibited area in which communication between terminals is prohibited, or the like, and correspondence between the specified area and the set area is stored in a table unit (not shown). When the PC 1 communicates with other terminals, and if the specified area is set as the terminal-to-terminal communication allowed area, the PC 1 can detect terminals that can communicate with the PC 1 in the specified area. On the other hand, if the specified area is set as the terminal-to-terminal communication prohibited area, the PC 1 can detect that the communication with terminals in the specified area is prohibited. The specified area can also be set as an information-sharing allowed area in which terminals are allowed to share information, an information-sharing prohibited area in which terminals are prohibited to share information, an communication allowed area in which terminals are allowed to communicate with external apparatuses, or an communication prohibited area in which terminals are prohibited to communicate with external apparatuses, and correspondence between the specified area and the set area is stored in the table unit (not shown).

A processing block diagram for the printer 2 is the same as FIG. 7, and therefore, explanation thereof is omitted.

Figure 8:
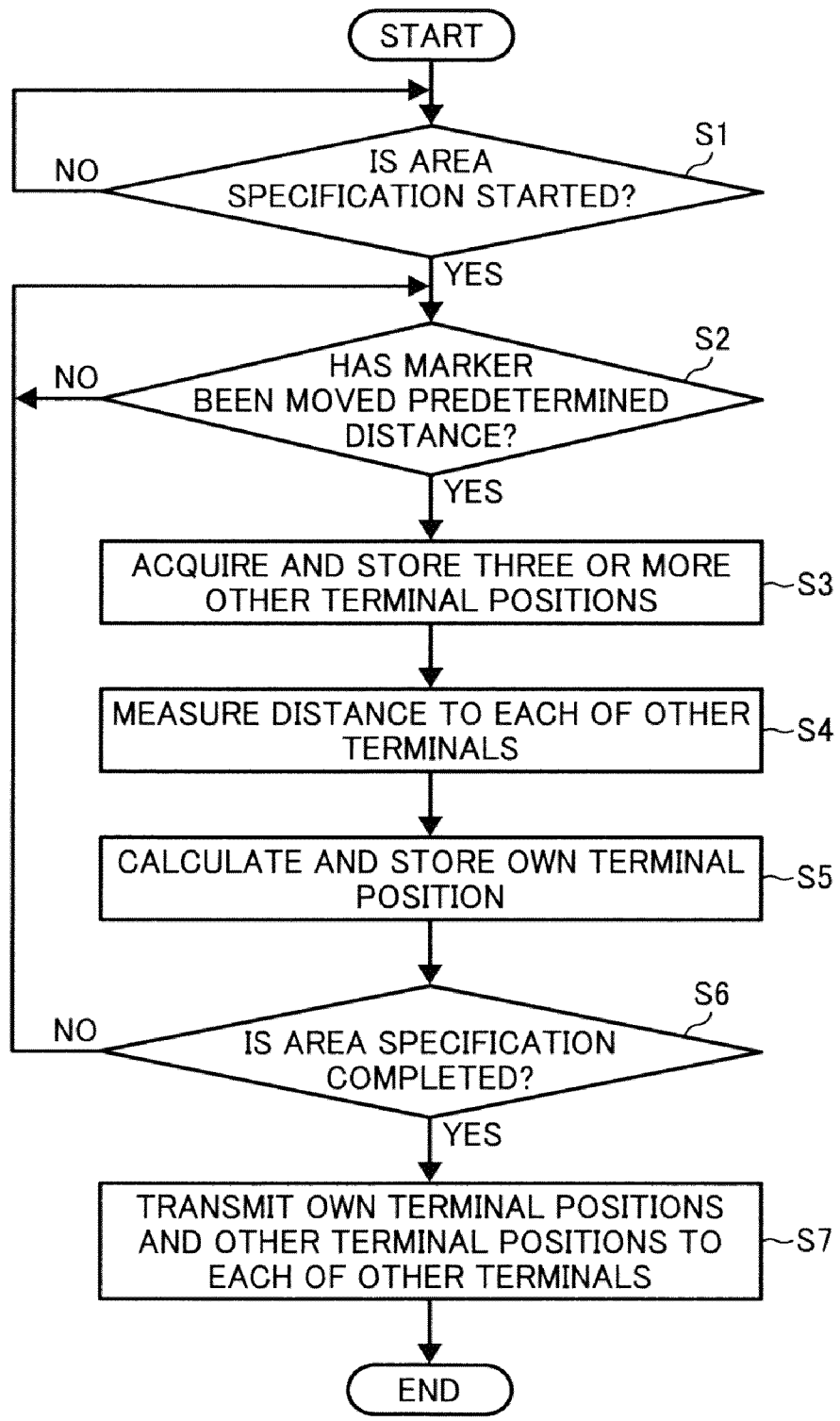
FIG. 8 is a flowchart of a process for specifying an area by the marker shown in FIG. 1.

FIG. 8 is a flowchart of a process for specifying an area by the marker (i.e., an area specification method) according to the first embodiment. In the following descriptions, the PC 1 and the printer 2 are collectively referred to as "other terminals", and the marker is referred to as "an own terminal". The process described below is based on the area specification shown in FIG. 3.

A user stands at the start point shown in FIG. 3B with the marker. The user then operates the operating unit 35 of the marker to instruct the marker to start the area specification. A start and an end of the area specification can be instructed by, for example, pressing a start switch and an end switch of the operating unit 35. The start switch and the end switch can be integrated as a single switch of the operating unit 35 such that the first press of the switch instructs a start of the area specification and the second press of the switch instructs an end of the area specification. Furthermore, the switch can be configured to instruct the marker to perform the area specification while the switch is being pressed, and end the area specification when the switch is released.

When the user instructs a start of the area specification (YES at Step S1), the distance measuring unit 62 determines whether the marker has been moved a predetermined distance from the start point shown in FIG. 3B (Step S2). The predetermined distance is a value set in advance. It is assumed here that the user carrying the marker moves from the start point to a point r along a dashed line in a direction indicated by an arrow in FIG. 3. Assuming that a distance from the start point to the point r is the predetermined distance set in advance, the distance measuring unit 62 determines that the marker has been moved the predetermined distance when the user arrives at the point r (YES at Step S2).

At this time, the other-terminal-position acquiring unit 61 acquires three or more other terminal positions (Step S3), and the distance measuring unit 62 measures distances from the own terminal (the marker) to the respective other terminals (Step S4). For example, the other-terminal-position acquiring unit 61 acquires the other terminal position of each of the PCs 1a, 1b, and the printer 2b, and the distance measuring unit 62 measures a distance from the point r to each of the PCs 1a, 1b, and the printer 2b. The acquired other terminal positions are stored in the table unit 64.

The own-terminal-position calculating unit 63 calculates the own terminal position (a position of the point r) by solving the above-mentioned simultaneous equations based on the acquired three or more other terminal positions and the measured distances, and then stores the calculated own terminal position (the position of the point r) in the table unit 64 (Step S5). The marker calculates the own terminal position (a position of the start point) and stores the calculated own terminal position in the table unit 64 in the same manner as mentioned above when the area specification is started at Step S1.

When an end of the area specification is not instructed (NO at Step S6), the distance measuring unit 62 again determines whether the marker has been moved the predetermined distance from the point r (Step S2). At a point s where the marker is moved the predetermined distance from the point r, the same processing from Step S3 is performed. At points t, u, v, and w, the same processing from Step S3 is also performed.

When the user returns to the start point after passing the point w and then instructs the end of the area specification (YES at Step S6), the own-terminal-position transmitting unit 65 transmits the own terminal positions and the other terminal positions stored in the table unit 64 to each of the other terminals (Step S7). The marker calculates the own terminal position (a position of the end point) and stores the calculated own terminal position in the table unit 64 in the same manner as mentioned above when the end of the area specification is instructed at Step S6. The own terminal positions (the marker positions) transmitted at Step S7 are respective coordinates of the start point, the points r, s, t, u, v, w, and the end point (the same as the start point). The other terminal positions transmitted at Step S7 are respective coordinates of the PCs 1a to 1c and the printers 2a and 2b.

Each of the other terminals (the PC 1 and the printer 2) stores the marker positions and the other terminal positions transmitted from the marker in a table unit (not shown in FIG. 7).

In this manner, each of the other terminals has the marker positions in common and recognizes an area enclosed by the marker positions as the specified area. As described above, the specified area is to be set and used as the terminal-to-terminal communication allowed area, the terminal-to-terminal communication prohibited area, the information-sharing allowed area, the information-sharing prohibited area, the communication allowed area, the communication prohibited area, or the like.

As described above, according to the first embodiment, the marker can be moved and an area enclosed by a movement locus of the marker (i.e., the marker positions) can be set as the specified area, so that the area specification can be performed by only a single marker. Therefore, costs of the marker and space for installing the marker can be reduced.

It is described that the marker transmits the marker positions and the other terminal positions to all the other terminals at Step S7 of the first embodiment (see FIG. 8). However, there can be a configuration in which the marker transmits a notice of the marker positions and the other terminal positions to at least one of the other terminals and causes the other terminal that has received the notice to transmit the notice to other terminals that have not received the notice.

Furthermore, it is described that the own terminal position is set in advance in each of the PCs 1a to 1c and the printers 2a and 2b. However, it is sufficient to set own terminal positions in advance in at least three respective other terminals.

Moreover, while the marker acquires the other terminal positions by communicating with the other terminals in which respective own terminal positions are set in advance, the marker (i.e., the other-terminal-position acquiring unit 61) can employ other methods for acquiring the other terminal positions. For example, it is possible to input and set three or more other terminal positions in the marker before the area specification is started. In this case, the marker always measures a distance to each of the other terminals that are set in advance while the marker is being moved. It is also possible to install a server device (not shown) that centrally collects and manages the other terminal positions so that the marker can acquire the other terminal positions by communicating with the server device.

Furthermore, in the first embodiment, the marker transmits the marker positions (i.e., positional information) and the other terminal positions to each of the other terminals, and each of the other terminals recognizes the specified area based on the marker positions and the other terminal positions. However, there can be a configuration in which the marker causes an area specifying unit (not shown) thereof to specify the specified area. There can be another configuration in which the marker that has specified the specified area determines whether a coordinate of each of the other terminals is within or out of the specified area to thereby determine whether each of the other terminals is within or out of the specified area (an area in-or-out determining unit). In this case, the marker can transmit information about a determination result to at least an arbitrary one of the other terminals (a determination-result transmitting unit).

Figure 9:
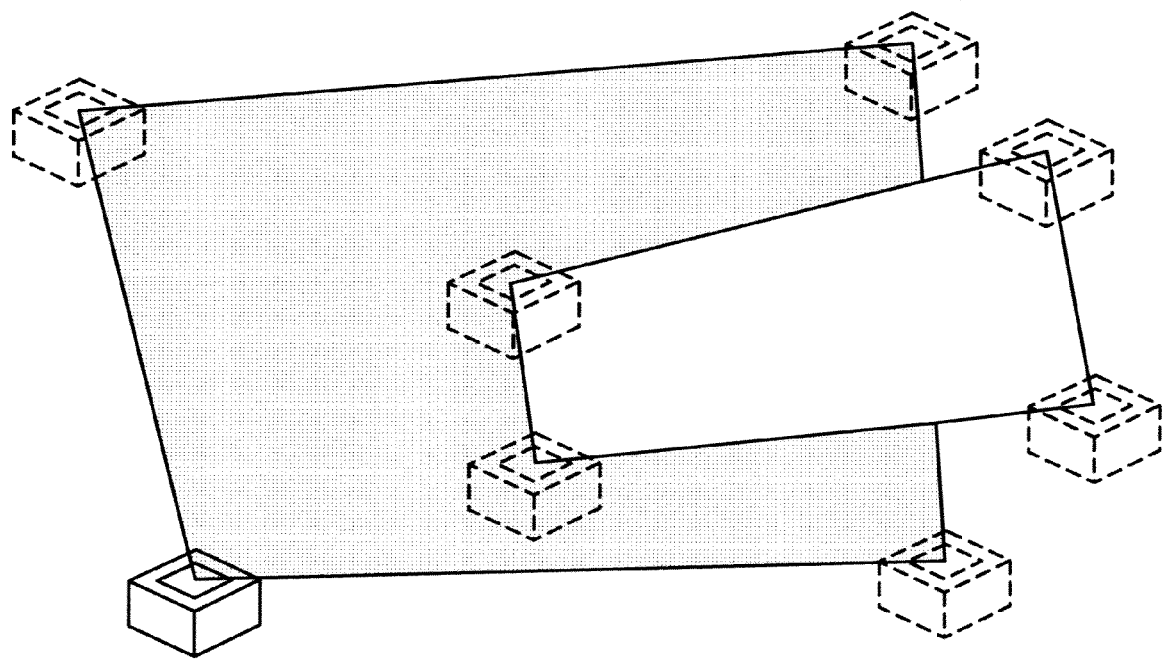
FIG. 9 is a schematic diagram of a plurality of exemplary areas specified by the marker shown in FIG. 1.

In the first embodiment, the area specification can be performed multiple times. In this case, setting for control or the like can be changed with respect to each specified area. For example, FIG. 9 illustrates two specified areas obtained by performing the area specification twice. In FIG. 9, assuming that a left one of the two specified areas is set as the communication allowed area and a right one of the two specified areas is set as the communication prohibited area, a dotted area is specified as an actual communication allowed area. Thus, a more complex range (area) can be specified by combining a plurality of the specified areas.

Figure 10:
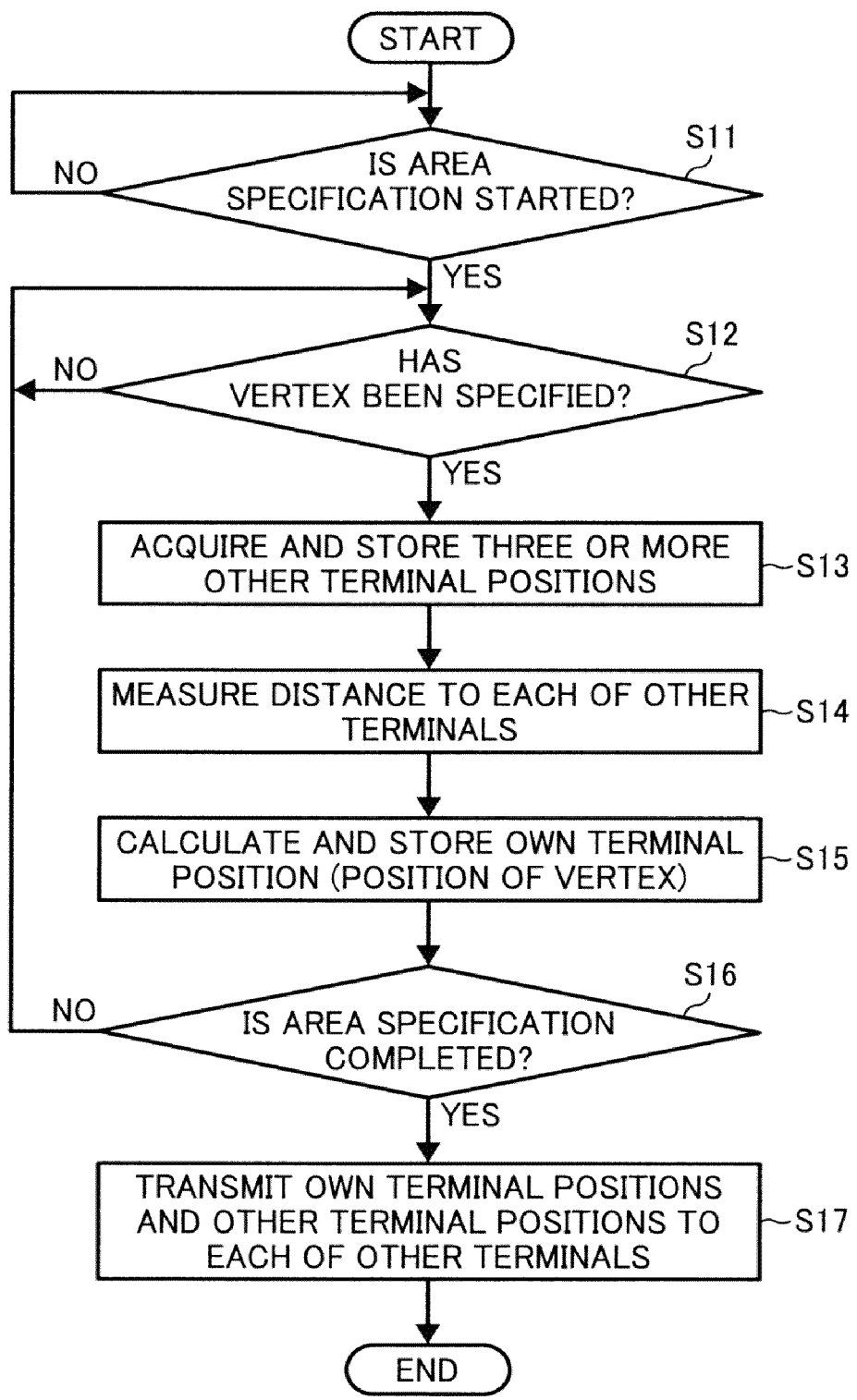
FIG. 10 is a flowchart of a process for specifying an area by the marker shown in FIG. 1.

In the first embodiment, while the area enclosed by the movement locus of the marker is determined as the specified area, it is possible to specify certain points as vertices so as to determine a polygonal area enclosed by the specified vertices as the specified area. This example is described in detail below with reference to a flowchart of FIG. 10. FIG. 10 is a flowchart of a process for specifying an area by the marker. The flowchart of FIG. 10 is basically the same as that of FIG. 8. However, while the marker automatically calculates the own terminal position (the marker position) with respect to each predetermined distance in the process of FIG. 8, the marker calculates the own terminal position (the marker position) only when a user performs a vertex specification operation in the process of FIG. 10. In the following descriptions, similarly to FIG. 8, the PC 1 and the printer 2 are collectively referred to as "other terminals" and the marker is referred to as "an own terminal".

When a user instructs a start of the area specification (YES at Step S11), the other-terminal-position acquiring unit 61 determines whether vertex specification operation for specifying a certain point as a vertex has been received (Step S12). The user is allowed to perform the vertex specification operation every time the user arrives at a vertex of an area to be specified while moving with the marker.

When determining that the vertex specification operation has been received (YES at Step S12), the other-terminal-position acquiring unit 61 acquires three or more other terminal positions (Step S13). The distance measuring unit 62 measures distances from the own terminal (the marker) to the respective other terminals (Step S14). The acquired other terminal positions are stored in the table unit 64.

The own-terminal-position calculating unit 63 calculates the own terminal position (a position of the vertex) by solving the above-mentioned simultaneous equations based on the acquired three or more other terminal positions and the measured distances, and then stores the calculated own terminal position (the position of the vertex) in the table unit 64 (Step S15). The marker calculates the own terminal position (a position of the start point) and stores the calculated own terminal position in the table unit 64 in the same manner as mentioned above when the area specification is started at Step S11.

When an end of the area specification is not instructed (NO at Step S16), the other-terminal-position acquiring unit 61 again determines whether the vertex specification operation has been received (Step S12). At a position where the vertex specification operation has been received, the same processing from Step S13 is performed.

When the end of the area specification is instructed (YES at Step S16), the own-terminal-position transmitting unit 65 transmits the own terminal positions and the other terminal positions stored in the table unit 64 to each of the other terminals (Step S17). The marker calculates the own terminal position (a position of the end point) and stores the calculated own terminal position in the table unit 64 in the same manner as mentioned above when the end of the area specification is instructed at Step S16. The own terminal positions (the marker positions) transmitted at Step S17 are respective coordinates of the start point, the vertices, and the end point. The other terminal positions transmitted at Step S17 are respective coordinates of the PCs 1a to 1c and the printers 2a and 2b.

Each of the other terminals (the PC 1 and the printer 2) stores the marker positions and the other terminal positions transmitted from the marker in a table unit (not shown in FIG. 7).

Figure 11:
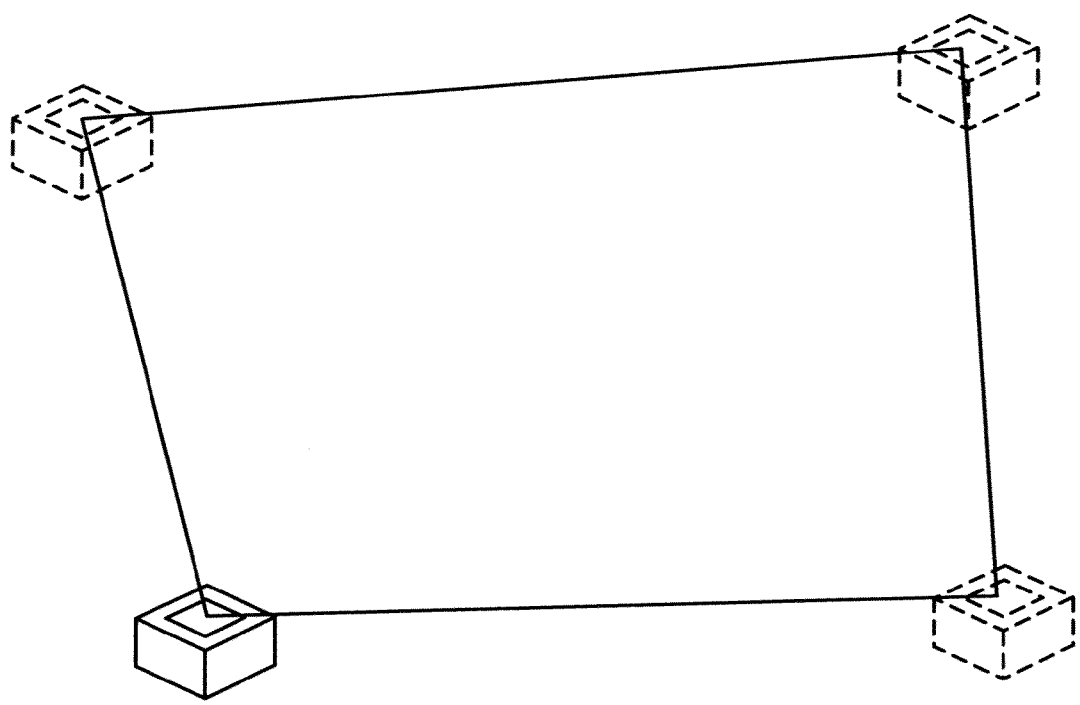
FIG. 11 is a schematic diagram of an exemplary quadrangular area specified by the marker shown in FIG. 1.
Figure 12:
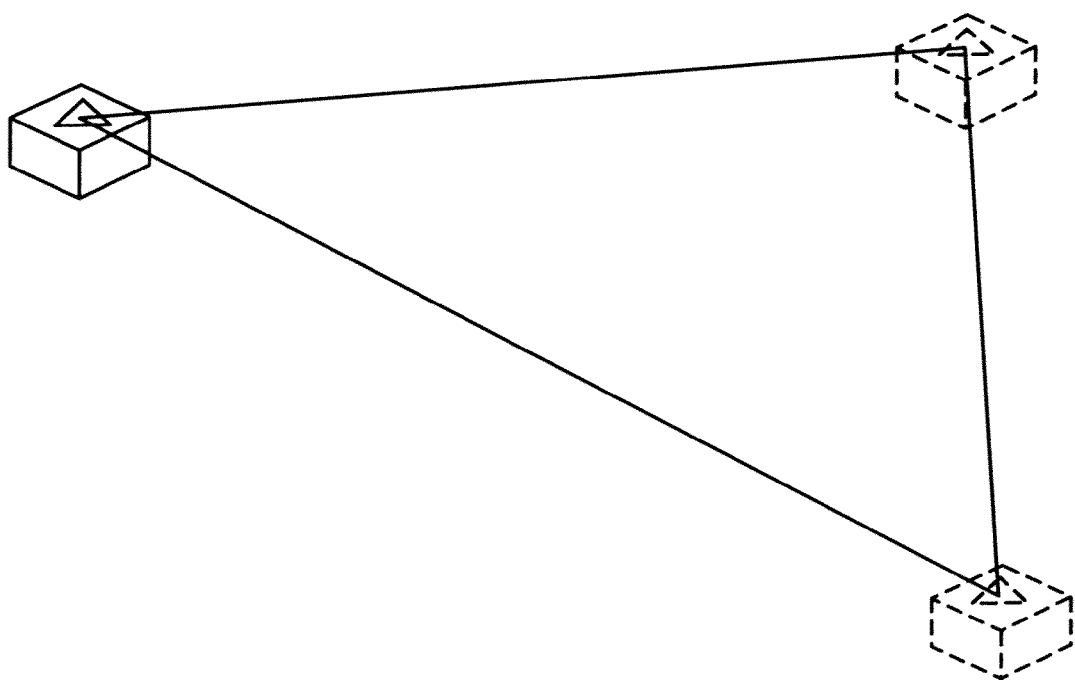
FIG. 12 is a schematic diagram of an exemplary triangular area specified by the marker shown in FIG. 1.

In this manner, each of the other terminals has the marker positions in common, connects adjacent marker positions with a line, and recognizes a polygonal area enclosed by the lines connecting the marker positions as the specified area. Exemplary polygonal specified areas are illustrated in FIGS. 11 and 12. FIG. 11 is a schematic diagram of an exemplary quadrangular specified area. FIG. 12 is a schematic diagram of an exemplary triangular specified area. The specified area is to be set and used as the terminal-to-terminal communication allowed area, the terminal-to-terminal communication prohibited area, the information-sharing allowed area, the information-sharing prohibited area, the communication allowed area, the communication prohibited area, or the like.

In the above examples, as a condition for ending the area specification, it is possible to set a shape of a polygon of the specified area in advance so that the area specification can be ended just after the vertex specification operation is performed a predetermined number of times according to the set shape. For example, when a triangle is set as the shape of the specified area, the area specification is ended after the vertex specification operation is performed three times. Furthermore, when a quadrangle is set as the shape of the specified area, the area specification is ended after the vertex specification operation is performed four times.

Figure 13A:
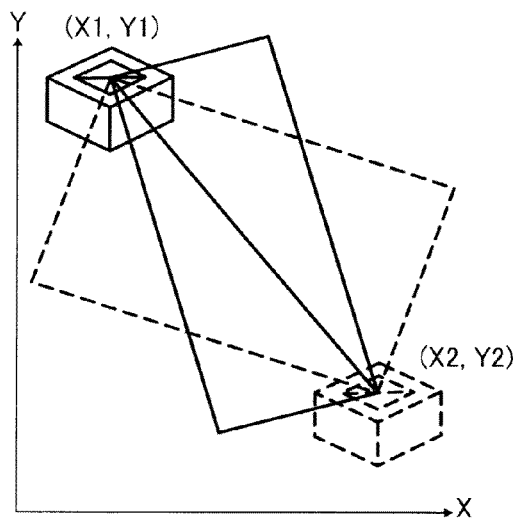
FIGS. 13A and 13B are schematic diagrams of exemplary quadrangular areas each having a diagonal connecting two coordinates of a marker according to a second embodiment of the present invention.
Figure 13B:
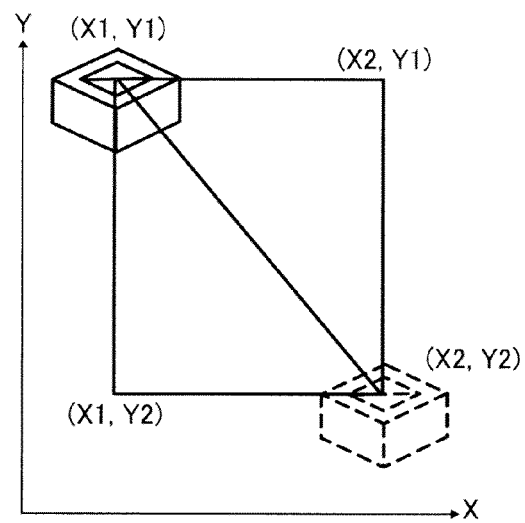

In the first embodiment, the area itself is specified. However, in a second embodiment of the present invention, a user who moves with the marker specifies only two points, i.e., two vertices, at diagonal positions of a quadrangle as shown in FIGS. 13A and 13B, so that the area specification can be made simpler. In other words, in the second embodiment, the marker is moved from a certain point to a certain point and a quadrangle having a diagonal connecting the two points are determined as the specified area.

The specified area corresponding to a quadrangle that has a diagonal connecting two specified points cannot be identified because a plurality of such quadrangles are obtained as illustrated in a bold line and a dashed line of FIG. 13A. Therefore, in the second embodiment, when positions of the two points are assumed as (X1,Y1) and (X2,Y2), respectively, other two points that have not been specified are determined along the X-axis and the Y-axis. More specifically, as shown in FIG. 13B, the other two points are determined as (X1,Y2) and (X2,Y1), respectively, so that the quadrangular specified area can be uniquely identified.

In the second embodiment, two coordinates of two respective points to be specified can be determined according to a position of a building, along with a certain direction, or the like. Therefore, a user can assuredly and easily perform the area specification.

When an area is specified simply in a two-dimensional manner without restriction in a height direction as described in the first and the second embodiments, terminals (e.g., PCs and printers) that are hidden on a floor, under a floor, under a roof, and the like may be included in the specified area. Furthermore, even when a user is not malicious, terminals (e.g., PCs and printers) in a different floor may be included in the specified area. To solve such a problem, in a third embodiment of the present invention, a two-dimensional area is specified in the same manner as the first and the second embodiments, and a maximum value and a minimum value in a height direction are respectively set as an upper limit value and a lower limit value in the height direction.

Figure 14:
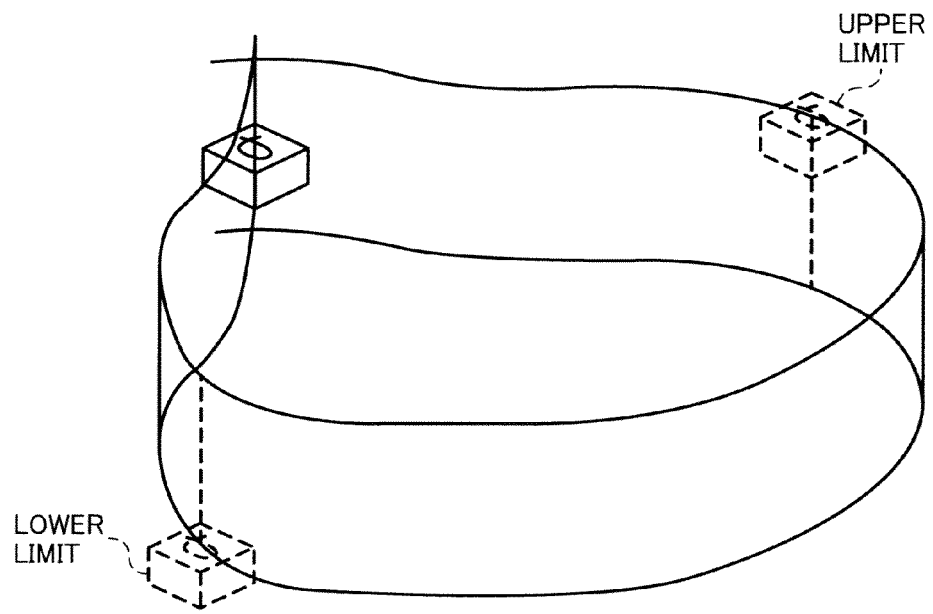
FIG. 14 is a schematic diagram of an exemplary curved area specified by a marker by taking a height into consideration according to a third embodiment of the present invention.

In the third embodiment, as shown in FIG. 14, the own-terminal-position calculating unit 63 of the marker calculates, as the own terminal positions, two coordinates of respective two-dimensional positions of the marker and heights of the marker in three-dimensional space, and sets a maximum value and a minimum value of all the calculated heights of the own terminal positions to an upper limit value and a lower limit value, respectively. Then, the marker transmits the two coordinates of the respective two-dimensional positions of the marker (i.e., the marker positions), the upper limit value, and the lower limit value to each of the other terminals. Each of the other terminals determines a three-dimensional specified area based on the two coordinates of the respective two-dimensional positions of the marker, the upper limit value, and the lower limit value.

Figure 15:
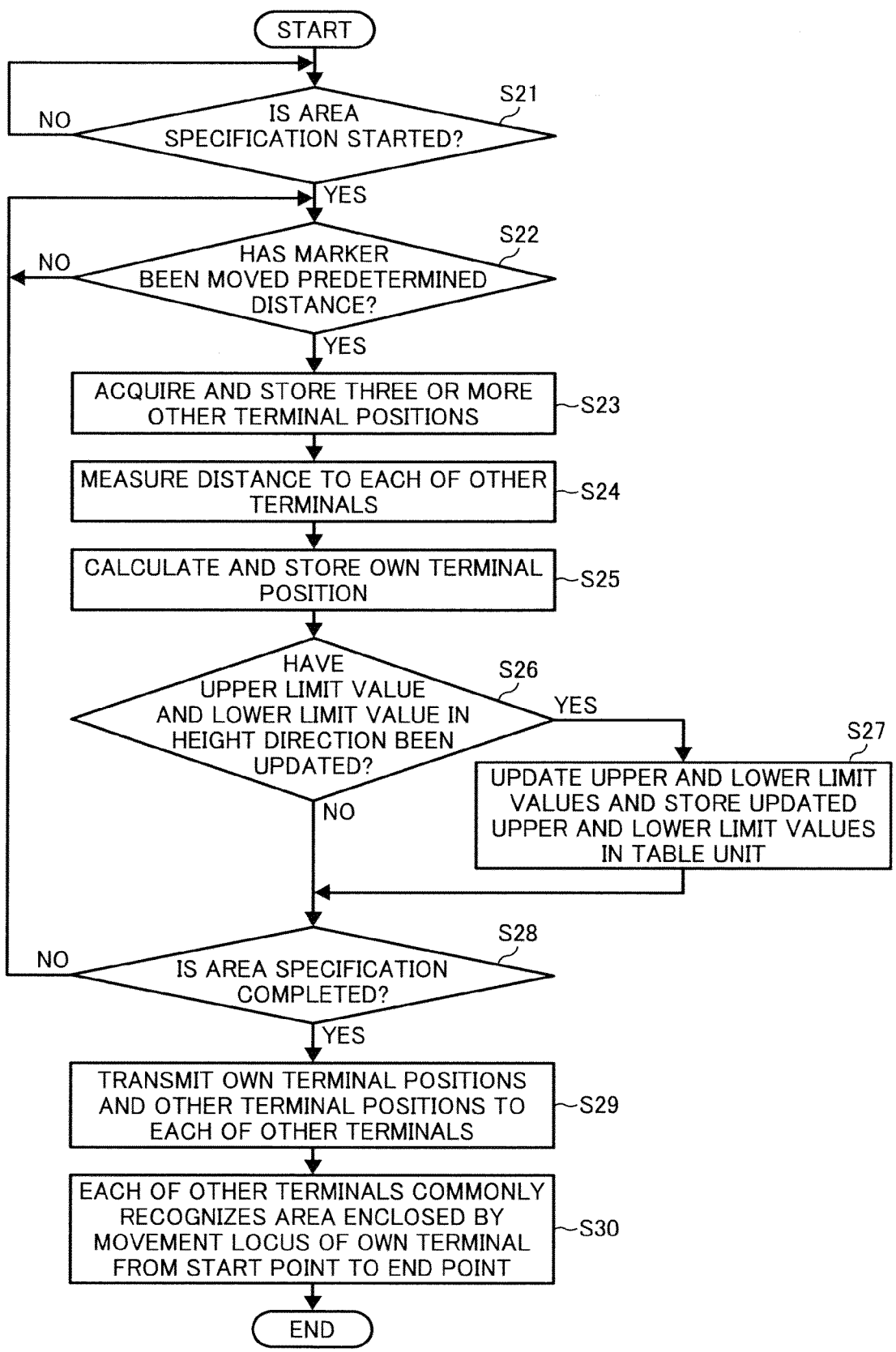
FIG. 15 is a flowchart of a process for specifying an area by a marker according to the third embodiment.

FIG. 15 is a flowchart of a process for specifying an area by the marker according to the third embodiment. The flowchart of FIG. 15 is basically the same as that of FIG. 8. However, while the own terminal position (i.e., the marker position) is calculated only in a two-dimensional manner in the process of FIG. 8, an area is specified based on not only the two-dimensional position but also the upper limit value and the lower limit value of a height of the marker in the process of FIG. 15. In the following descriptions, similarly to FIG. 8, the PC 1 and the printer 2 are collectively referred to as "other terminals" and the marker is referred to as "an own terminal".

Processes from a start of the area specification by a user to a measurement of a distance to each of the other terminals (i.e., Steps S21 to S24) are the same as those of the first embodiment (see Steps S1 to S4 of FIG. 8), and therefore, explanation thereof is omitted.

The own-terminal-position calculating unit 63 calculates the own terminal position (a position of the point r) containing the coordinate of the position of the own terminal as well as the upper limit value and the lower limit value of the height of the own terminal by solving the above-mentioned simultaneous equations based on the acquired three or more other terminal positions and the measured distances, and then stores the calculated own terminal position (the position of the point r) in the table unit 64 (Step S25). The marker calculates the own terminal position (a position of the start point) and stores the calculated own terminal position in the table unit 64 in the same manner as described above when the area specification is started at Step S21.

The own-terminal-position calculating unit 63 determines whether the upper limit value and the lower limit value of the height of the own terminal at the calculated position are updated (Step S26). When the upper limit value or the lower limit value is updated (YES at Step S26), the own-terminal-position calculating unit 63 updates the upper limit value or the lower limit value and stores the update upper limit value or the update lower limit value in the table unit 64 (Step S27). On the other hand, when the upper limit value and the lower limit value are not updated (NO at Step S26), process control proceeds to Step S28.

Then, it is determined whether an end of the area specification is instructed (Step S28). When the end of the area specification is not instructed (NO at Step S28), the distance measuring unit 62 again determines whether the marker has moved a predetermined distance from the point r (Step S22). At a point s where the marker has moved the predetermined distance from the point r, the same processing from Step S23 is performed. At points t, u, v, and w, the same processing from Step S3 is also performed.

When the user returns to the start point after passing the point w and then instructs the end of the area specification (YES at Step S28), the own-terminal-position transmitting unit 65 transmits the own terminal positions and the other terminal positions stored in the table unit 64 to each of the other terminals (Step S29). The marker calculates the own terminal position (a position of the end point) and stores the calculated own terminal position in the table unit 64 in the same manner as mentioned above when the end of the area specification is instructed at Step S28. The own terminal positions (the marker positions) transmitted at Step S29 are respective coordinates of the start point, the points r, s, t, u, v, w and the end point (the same as the start point). The other terminal positions transmitted at Step S29 are respective coordinates of the PCs 1a to 1c and the printers 2a and 2b.

Each of the other terminals (the PC 1 and the printer 2) stores the marker positions and the other terminal positions transmitted from the marker (the own terminal) in a table unit (not shown in FIG. 7), so that each of the other terminals commonly recognizes an area enclosed by a movement locus of the own terminal from the start point to the end point (Step S30).

Figure 16:
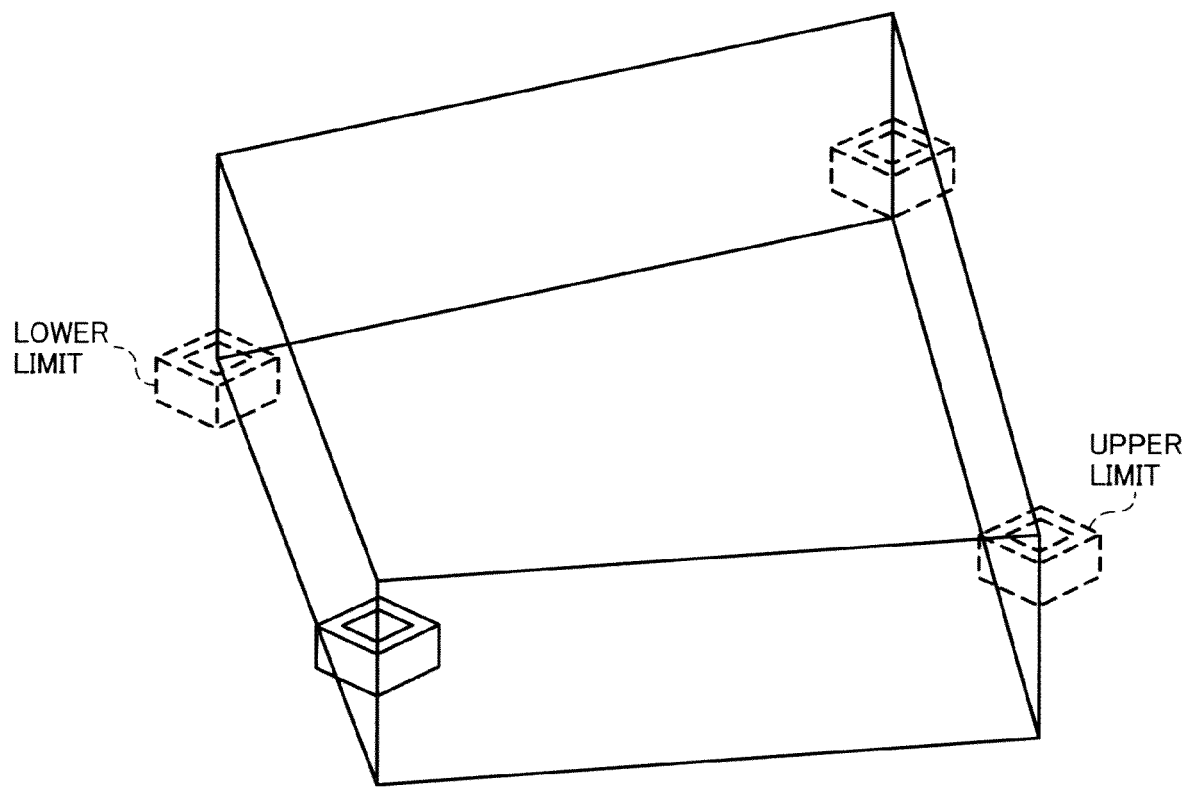
FIG. 16 is a schematic diagram of an exemplary quadrangular area specified by the marker by taking a height into consideration according to the third embodiment.

In the third embodiment, as shown in FIG. 16, the own-terminal-position calculating unit 63 of the marker calculates, as the own terminal positions, two coordinates of respective two-dimensional positions of vertices of the marker and heights of the marker in three-dimensional space, and sets a maximum value and a minimum value of all the calculated heights of the own terminal positions (i.e., positions of the vertices) to an upper limit value and a lower limit value, respectively. Then, the marker transmits the coordinates of the respective two-dimensional positions of the marker (i.e., the marker positions), the upper limit value, and the lower limit value to each of the other terminals. Each of the other terminals determines a three-dimensional specified area based on the coordinates of the respective two-dimensional positions of the vertices of the marker, the upper limit value, and the lower limit value.

Figure 17:
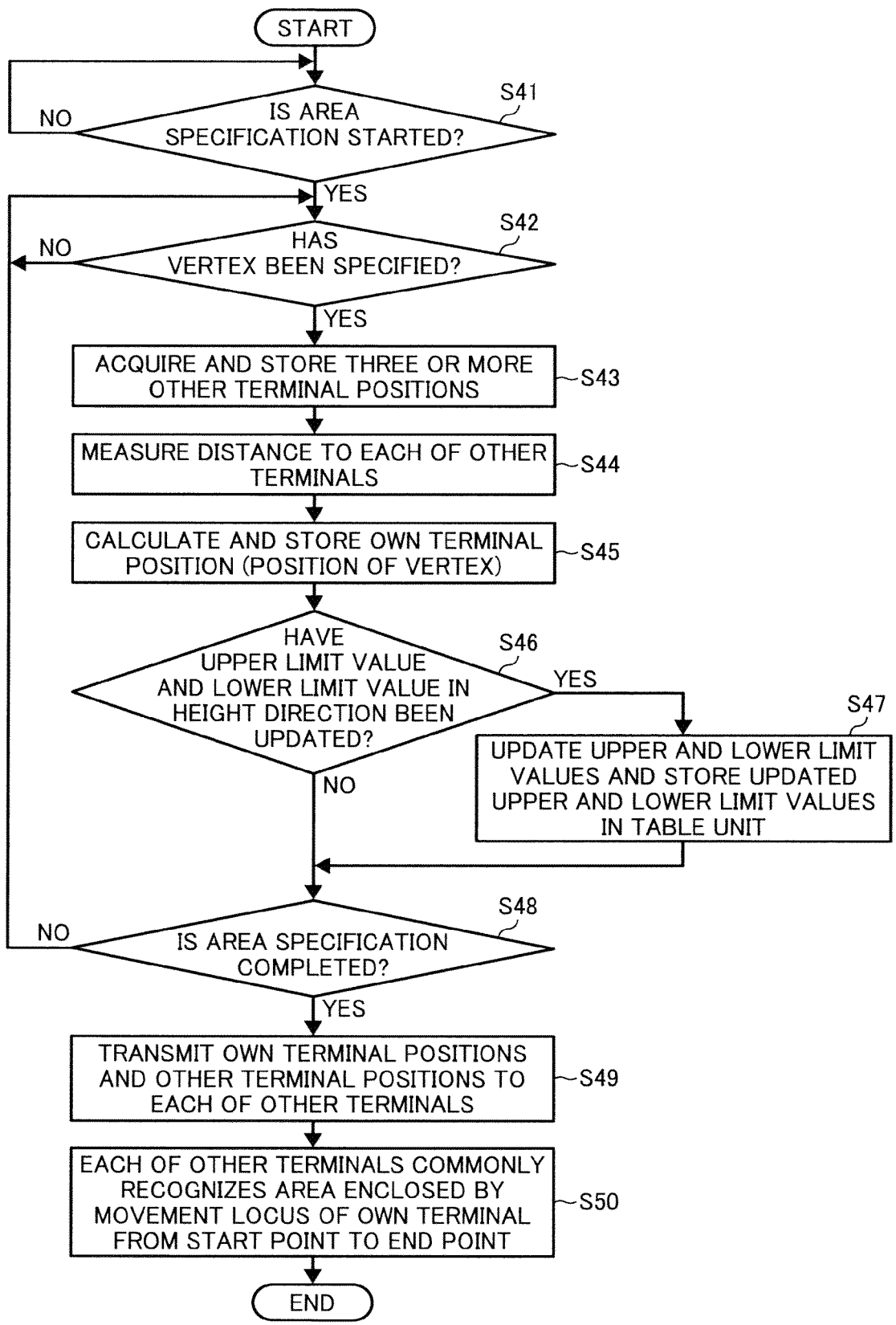
FIG. 17 is a flowchart of a process for specifying an area by the marker according to the third embodiment.

FIG. 17 is a flowchart of a process for specifying an area by the marker according to the third embodiment. The flowchart of FIG. 17 is basically the same as that of FIG. 10. However, while the own terminal position (i.e., the marker position) is calculated only in a two-dimensional manner in the process of FIG. 10, an area is specified based on not only the two-dimensional position but also the upper limit value and the lower limit value of a height of the marker in the process of FIG. 17. In the following descriptions, similarly to FIG. 8, the PC 1 and the printer 2 are collectively referred to as "other terminals" and the marker is referred to as "an own terminal".

Processes from a start of the area specification by a user to a measurement of a distance to each of the other terminals (i.e., Steps S41 to S44) are the same as those of the first embodiment (see Steps S11 to S14 of FIG. 10), and therefore, explanation thereof is omitted.

The own-terminal-position calculating unit 63 calculates the own terminal position (a position of the point r) containing a coordinate of the position of the own terminal as well as an upper limit value and a lower limit value of the height of the own terminal by solving the above-mentioned simultaneous equations based on the acquired three or more other terminal positions and the measured distances, and then stores the calculated own terminal position (the position of the point r) in the table unit 64 (Step S45). The marker calculates the own terminal position (a position of the start point) and stores the calculated own terminal position in the table unit 64 in the same manner as described above when the area specification is started at Step S41.

The own-terminal-position calculating unit 63 determines whether the upper limit value or the lower limit value of the height of the own terminal at the calculated position is updated (Step S46). When the upper limit value or the lower limit value is updated (YES at Step S46), the own-terminal-position calculating unit 63 updates the upper limit value or the lower limit value and stores the updated upper limit value or the updated lower limit value in the table unit 64 (Step S47). On the other hand, when the upper limit value and the lower limit value are not updated (NO at Step S46), process control proceeds to Step S48.

Then, it is determined whether an end of the area specification is instructed (Step S48). When the end of the area specification is not instructed (NO at Step S48), the distance measuring unit 62 again determines whether the vertex specification operation for specifying a certain point as a vertex has been received (Step S42). At a point where the vertex specification operation has been received, the same processing from Step S43 is performed.

When the end of the area specification is instructed (YES at Step S48), the own-terminal-position transmitting unit 65 transmits the own terminal positions and the other terminal positions stored in the table unit 64 to each of the other terminals (Step S49). The marker calculates the own terminal position (a position of the end point) and stores the calculated own terminal position in the table unit 64 in the same manner as described above when the end of the area specification is instructed at Step S48. The own terminal positions (the marker positions) transmitted at Step S49 are respective coordinates of the start point, the vertices, and the end point (the same as the start point). The other terminal positions transmitted at Step S49 are respective coordinates of the PCs 1a to 1c and the printers 2a and 2b as shown in FIG. 3B.

Each of the other terminals (the PC 1 and the printer 2) stores the marker positions and the other terminal positions transmitted from the marker (the own terminal) in a table unit (not shown in FIG. 7), so that each of the other terminals commonly recognizes an area enclosed by the vertices of the own terminal from the start point to the end point (Step S50).

Figure 18:
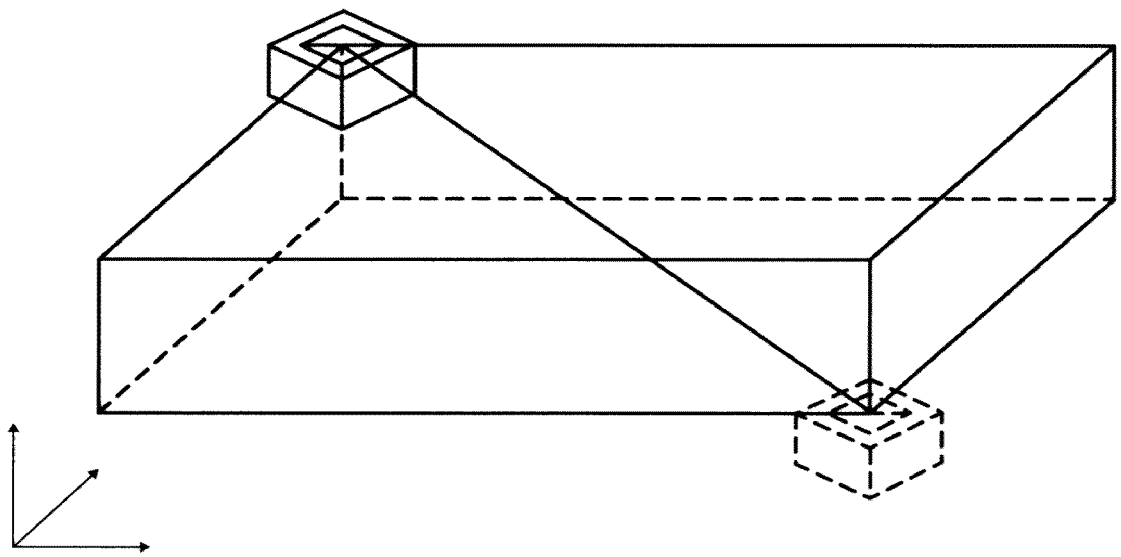
FIG. 18 is a schematic diagram of an exemplary quadrangular area having a diagonal connecting two positions of the marker and specified by the marker by taking a height into consideration according to the third embodiment.
Figure 19:
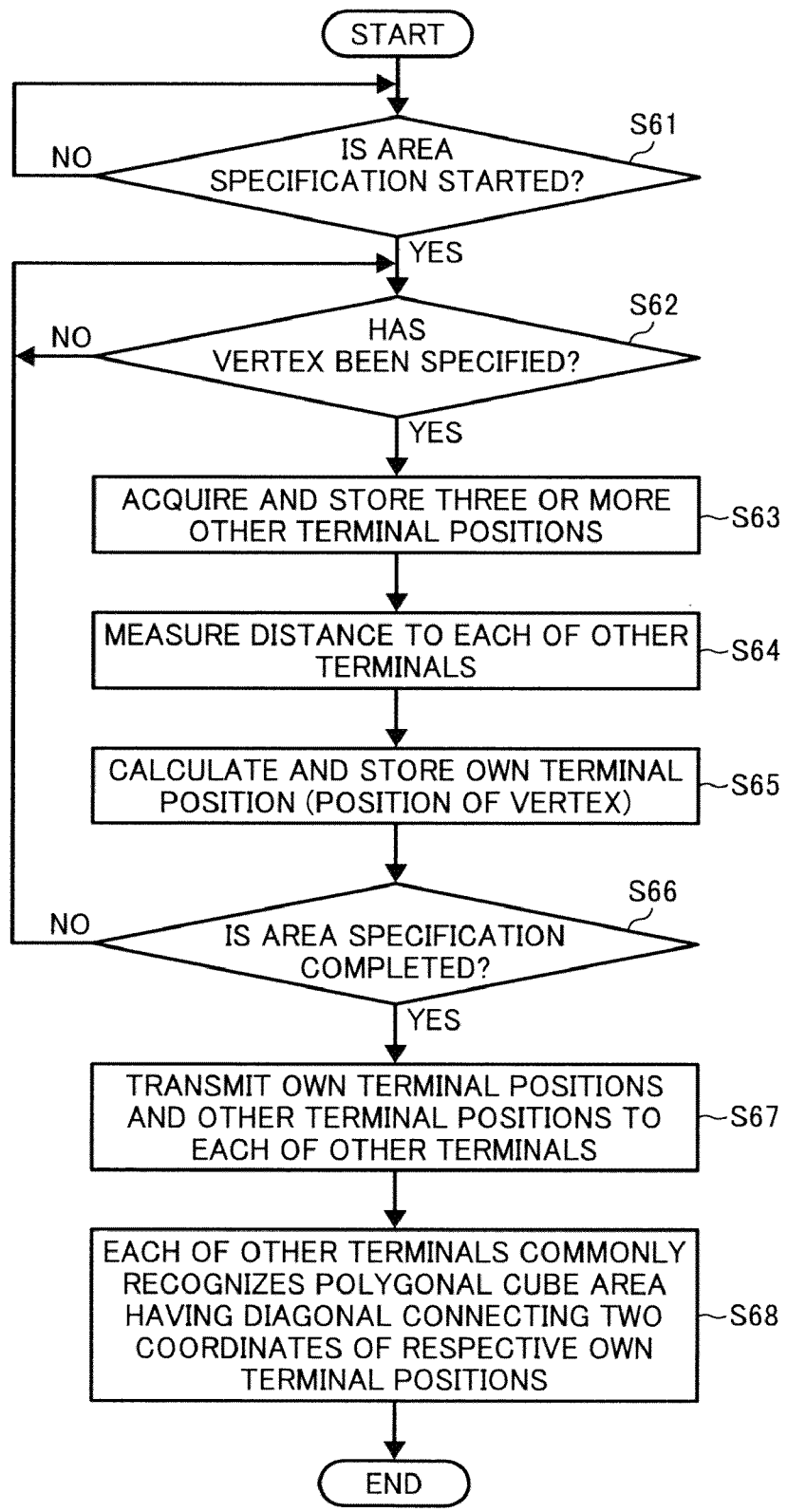
FIG. 19 is a flowchart of a process for specifying an area by the marker according to the third embodiment.

In the third embodiment, as shown in FIG. 18, the specified area is set by specifying vertices at diagonal positions of a quadrangle, similarly to the second embodiment. FIG. 19 is a flowchart of a process for specifying an area by the marker according to the third embodiment. The flowchart of FIG. 19 is different from that of FIG. 10 in that an area is specified based on not only the two-dimensional position but also the upper limit value and the lower limit value of a height of the marker, while, in the process of FIG. 10, the own terminal position (i.e., the marker position) is calculated only in a two-dimensional manner. In the following descriptions, similarly to FIG. 8, the PC 1 and the printer 2 are collectively referred to as "other terminals" and the marker is referred to as "an own terminal".

Processes from a start of the area specification by a user to a measurement of a distance to each of the other terminals (i.e., Steps S61 to S64) are the same as those of the first embodiment (see Steps S11 to S14 of FIG. 10), and therefore, explanation thereof is omitted.

The own-terminal-position calculating unit 63 calculates the own terminal position (a position of the point r) containing a coordinate of the position of the own terminal as well as an upper limit value and a lower limit value of the height of the own terminal by solving the above-mentioned simultaneous equations based on the acquired three or more other terminal positions and the measured distances, and then stores the calculated own terminal position (the position of the point r) in the table unit 64 (Step S65).

Then, it is determined whether an end of the area specification is instructed (Step S66). When the end of the area specification is not instructed (NO at Step S66), the distance measuring unit 62 again determines whether the vertex specification operation for specifying a certain point as a vertex has been received (Step S62). At a point where the vertex specification operation has been received, the same processing from Step S63 is performed.

When the end of the area specification is instructed (YES at Step S66), the own-terminal-position transmitting unit 65 transmits the own terminal positions and the other terminal positions stored in the table unit 64 to each of the other terminals (Step S67). The own terminal positions (the marker positions) transmitted at Step S67 are two coordinates of the two respective marker positions (i.e., the two vertices). The other terminal positions transmitted at Step S67 are respective coordinates of the PCs 1a to 1c and the printers 2a and 2b as shown in FIG. 3B.

Each of the other terminals (the PC 1 and the printer 2) stores the two marker positions and the other terminal positions transmitted from the marker (the own terminal) in a table unit (not shown in FIG. 7), so that each of the other terminals commonly recognizes a polygonal cube area having a diagonal connecting the two coordinates of the two respective marker positions (Step S68).

Figure 20:
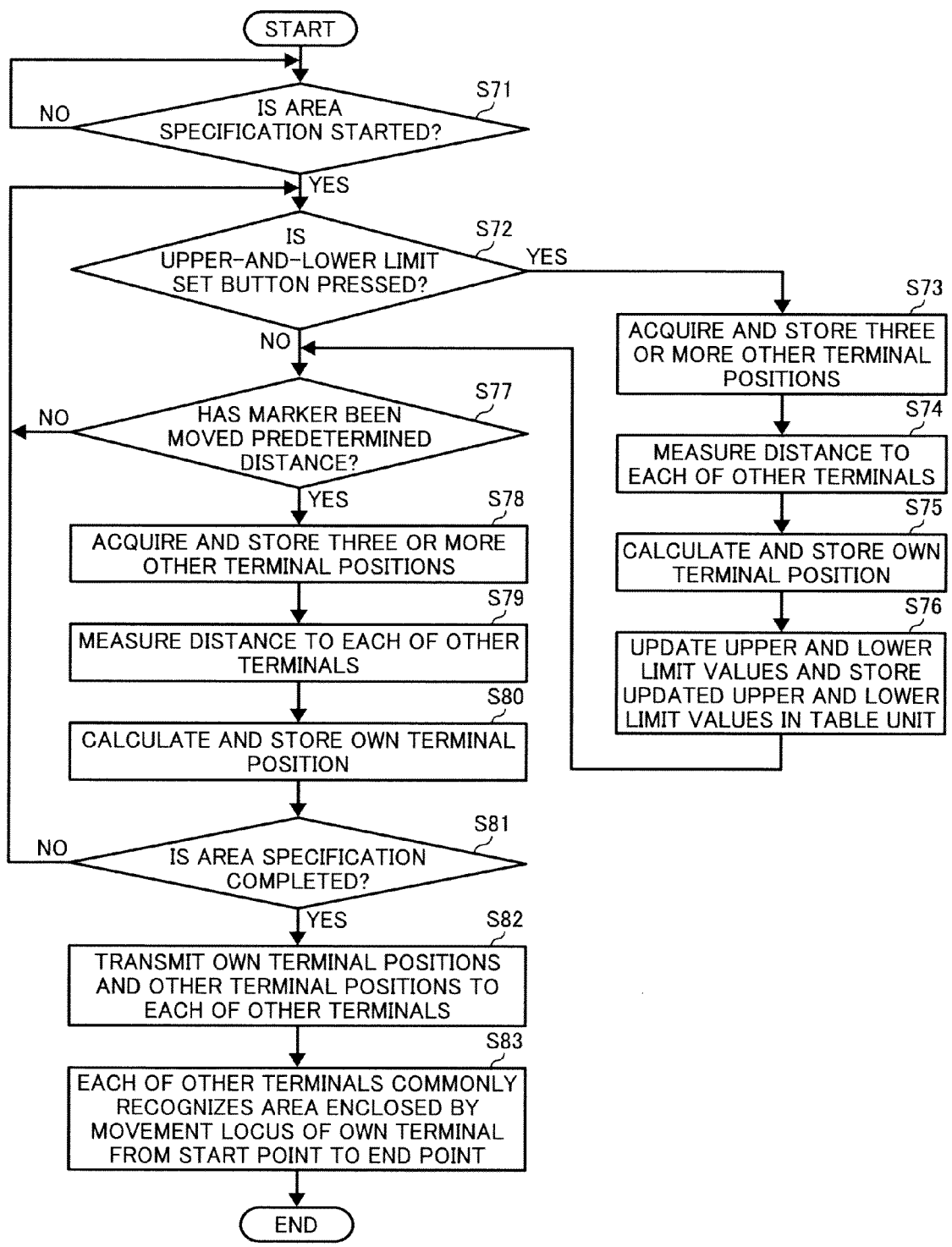
FIG. 20 is a flowchart of a process for specifying an area by the marker according to the third embodiment.

Alternatively, it is possible to specify a two-dimensional area in the same manner as the first and the second embodiments, and then specify an upper limit and a lower limit in the height direction by using a button (e.g., a switch) for specifying the upper limit and the lower limit. FIG. 20 is a flowchart of a process for specifying an area by the marker according to the third embodiment. In the following descriptions, similarly to FIG. 8, the PC 1 and the printer 2 are collectively referred to as "other terminals" and the marker is referred to as "an own terminal".

When a user instructs a start of the area specification (YES at Step S71), the distance measuring unit 62 determines whether an upper-and-lower limit set button (not shown) is pressed (Step S72). When the upper-and-lower limit set button is not pressed (NO at Step S72), process control proceeds to Step S77.

On the other hand, when the upper-and-lower limit set button is pressed (YES at Step S72), the other-terminal-position acquiring unit 61 acquires three or more other terminal positions (Step S73). The distance measuring unit 62 measures distances from the own terminal (the marker) to the respective other terminals (Step S74). The acquired other terminal positions are stored in the table unit 64.

The own-terminal-position calculating unit 63 calculates the own terminal position (a position of the point r) containing the coordinate of the position of the own terminal as well as the upper limit value and the lower limit value of the height of the own terminal by solving the above-mentioned simultaneous equations based on the acquired three or more other terminal positions and the measured distances, and then stores the calculated own terminal position (the position of the point r) in the table unit 64 (Step S75). The marker calculates the own terminal position (a position of the start point) and stores the calculated own terminal position in the table unit 64 in the same manner as described above when the area specification is started at Step S71. The own-terminal-position calculating unit 63 updates the upper limit value or the lower limit value and stores the updated upper limit value or the updated lower limit value in the table unit 64 (Step S76).

The distance measuring unit 62 then determines whether the marker has been moved a predetermined distance from the start point shown in FIG. 3B (Step S77). The predetermined distance is a value set in advance. Similarly to FIG. 8, assuming that a distance from the start point to the point r is the predetermined distance set in advance, the distance measuring unit 62 determines that the marker has been moved the predetermined distance when the user arrives at the point r (YES at Step S77).

At this time, the other-terminal-position acquiring unit 61 acquires three or more other terminal positions (Step S78), and the distance measuring unit 62 measures distances from the own terminal (the marker) to the respective other terminals (Step S79). The acquired other terminal positions are stored in the table unit 64.

The own-terminal-position calculating unit 63 calculates the own terminal position (a position of the point r) by solving the above-mentioned simultaneous equations based on the acquired three or more other terminal positions and the measured distances, and then stores the calculated own terminal position (the position of the point r) in the table unit 64 (Step S80).

When an end of the area specification is not instructed (NO at Step S81), the distance measuring unit 62 again determines whether the upper-and-lower limit set button has been pressed (Step S72). Then, the same processing from Step S73 is performed. In this manner, at points s, t, u, v, and w, the same processing from Step S73 is also performed.

When the user returns to the start point after passing the point w and then instructs the end of the area specification (YES at Step S81), the own-terminal-position transmitting unit 65 transmits the own terminal positions and the other terminal positions stored in the table unit 64 to each of the other terminals (Step S82). The marker calculates the own terminal position (a position of the end point) and stores the calculated own terminal position in the table unit 64 in the same manner as mentioned above when the end of the area specification is instructed at Step S81. The own terminal positions (the marker positions) transmitted at Step S82 are respective coordinates of the start point, the points r, s, t, u, v, w, and the end point (the same as the start point). The other terminal positions transmitted at Step S82 are respective coordinates of the PCs 1a to 1c and the printers 2a and 2b.

Each of the other terminals (the PC 1 and the printer 2) stores the marker positions and the other terminal positions transmitted from the marker (the own terminal) in a table unit (not shown in FIG. 7), so that each of the other terminals commonly recognizes an area enclosed by a movement locus of the own terminal from the start point to the end point (Step S83).

In the third embodiment, the upper limit value and the lower limit value of the height can be determined as respective heights of predetermined centimeters above and below an average of the calculated heights of the own terminal positions (i.e., the marker positions).

The above-mentioned upper limit and the lower limit in the height direction can be determined by the own-terminal-position calculating unit 63 in the same manner as the calculation of the own terminal position. More specifically, the own-terminal-position calculating unit 63 calculates the own terminal position (X, Y) on a two-dimensional plane, and then adds a maximum value Z and a minimum value z that are set in advance so that the own terminal position can be obtained in three-dimensional space by taking the height into consideration.

According to the third embodiment, a three-dimensional area can be specified through the area specification based on the coordinates on a two-dimensional plane and information about the height (i.e., the maximum value and the minimum value). Therefore, terminals that are hidden on a floor, under a floor, or under a roof, or located on a different floor can be excluded from the specified area.

When more than one marker is fixedly placed for performing the area specification as disclosed in Japanese Patent Application Laid-open No. 2008-199422, a positional relation between the marker and each terminal is recognizable in an actual specified area. However, when the marker can be removed from the specified area after the area specification has been completed as described in the first to the third embodiments, it is difficult to clarify a positional relation between the specified area and each terminal. To solve such a problem, a fourth embodiment of the present invention will be described below.

The marker of the first embodiment does not include a display unit as shown in FIG. 1. In contrast, in the fourth embodiment, the marker further includes a display unit. The marker of the fourth embodiment performs the area specification in the same manner as described in the first to the third embodiments, and then, displays a positional relation between the specified area and each terminal on the display unit.

Figure 21:
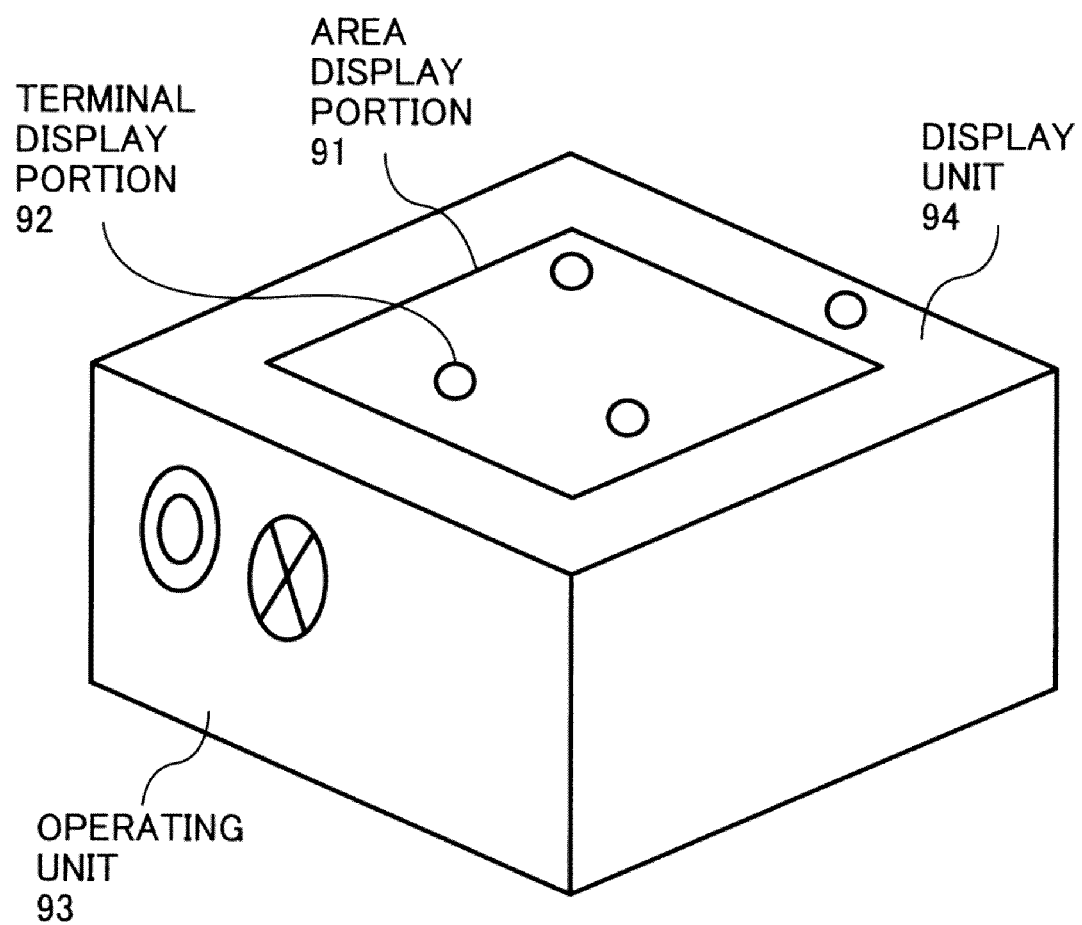
FIG. 21 is a schematic diagram of a marker that includes a display unit according to a fourth embodiment of the present invention.

FIG. 21 is a schematic diagram of a marker that includes a display unit 94 according to the fourth embodiment. As shown in FIG. 21, the marker of the fourth embodiment includes an operating unit 93 on a side surface thereof (corresponding to the operating unit 35 shown in FIG. 1), and the display unit 94 on a top surface thereof. The display unit 94 can be a conventionally-known display device. As shown in FIG. 21, the display unit 94 includes an area display portion 91 that displays a specified area drawn in a line or the like and a terminal display portion 92 that displays a positional relation between terminals located within or around the specified area, which are drawn as a symbol, a figure, or the like.

Figure 22:
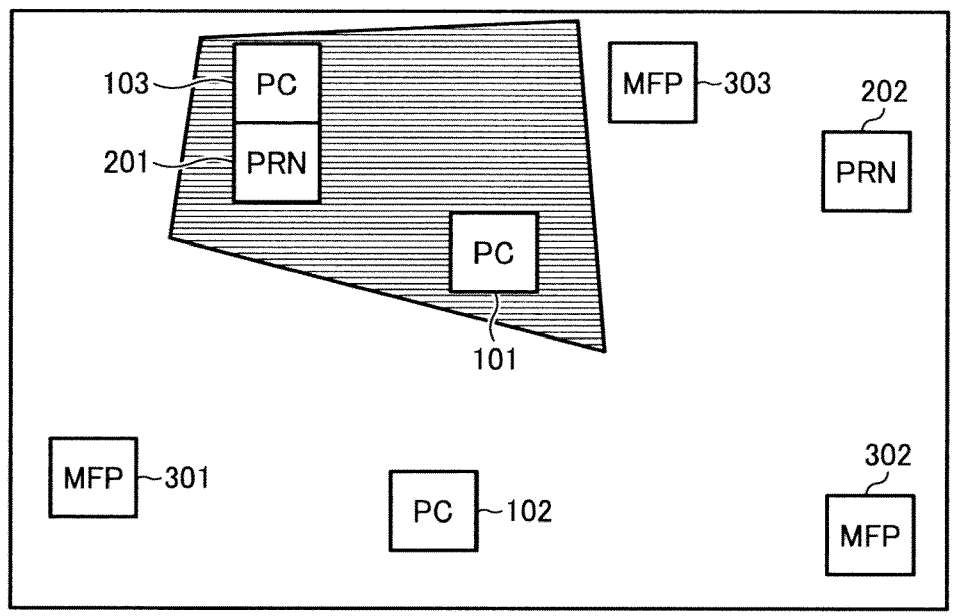
FIG. 22 is a schematic diagram of an exemplary display screen that displays a positional relation between a specified area and each terminal according to the fourth embodiment.

FIG. 22 is a schematic diagram of a display screen in which a positional relation between the specified area and each terminal located within or around the specified area is displayed like a map. In the display screen shown in FIG. 22, it is indicated that PCs 101, 103, and a printer 201 are located within the specified area (i.e., the hatched area). In the following example, it is assumed that a user wants to include an MFP 303 in the specified area.

Figure 23:
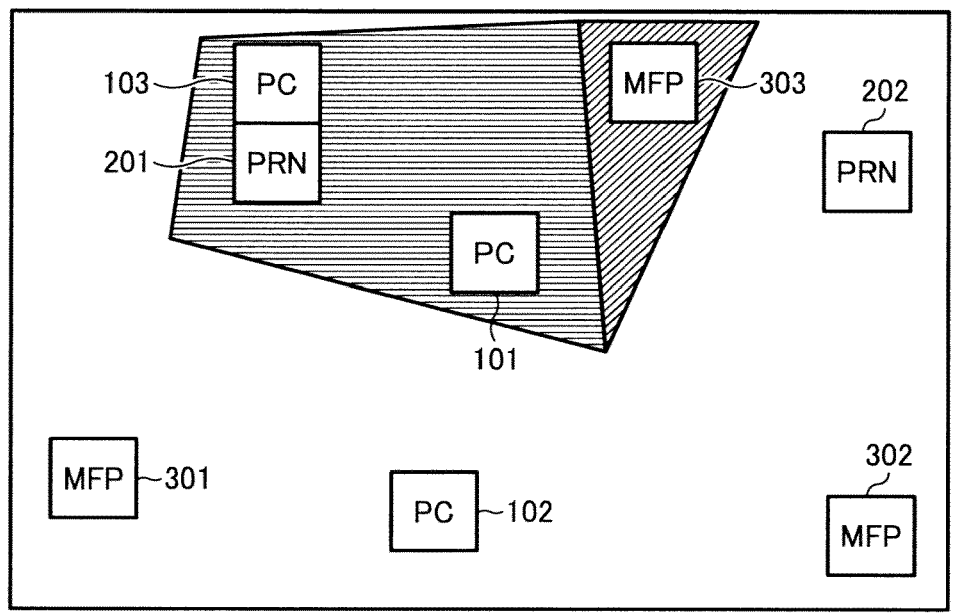
FIG. 23 is a schematic diagram of an exemplary display screen that displays a positional relation between a specified area and each terminal according to the fourth embodiment.

The user is allowed to move the marker while looking at the display screen of the PC (see FIG. 22) and the display unit 94 of the marker (see FIG. 21). The user is also allowed to perform area correcting operation by dragging a vertex of the specified area on the display screen. Accordingly, the PC receives an instruction for correcting the specified area from the user, and causes a correcting unit (not shown) to correct the specified area according to the instruction. FIG. 23 illustrates an example of the display screen of the PC after the specified area has been corrected. As shown in FIG. 23, the expanded specified area in which the MFP 303 is included is displayed on the display screen.

Figure 24:
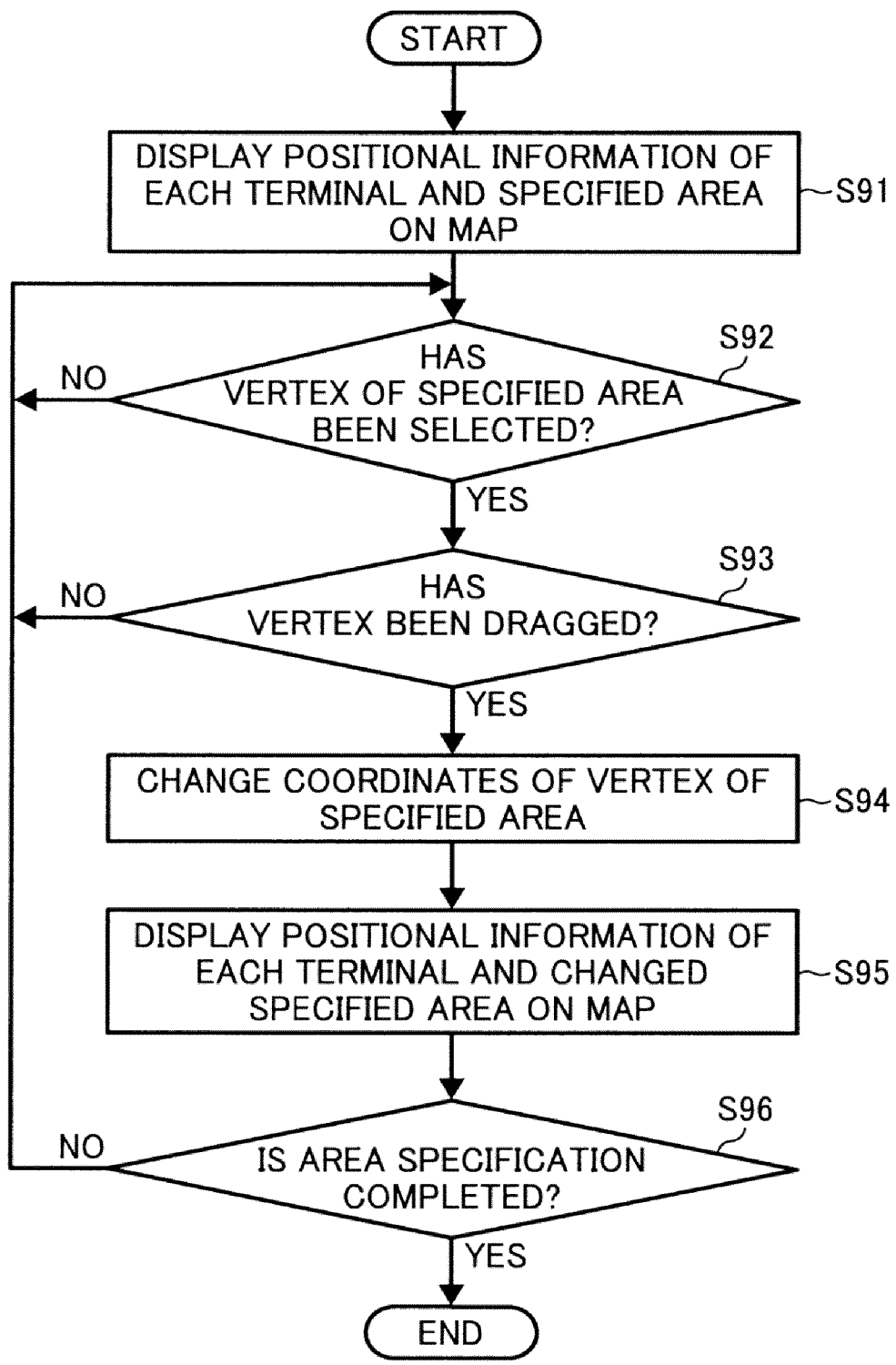
FIG. 24 is a flowchart of a process for correcting a specified area according to the fourth embodiment.

FIG. 24 is a flowchart of a process for correcting the specified area according to the fourth embodiment. The PC control unit 21 displays positional information of each terminal and a specified area on a map of the display unit 24 (Step S91). The PC control unit 21 determines whether a vertex of the specified area has been selected by the operating unit 25 based on a selected coordinate (Step S92). When the vertex of the specified area has not been specified (NO at Step S92), processing is repeated until the vertex is selected.

On the other hand, when the vertex of the specified area has been selected (YES at Step S92), the PC control unit 21 determines whether the selected vertex of the specified area has been dragged (Step S93). When the vertex has not been dragged (NO at Step S93), process control returns to Step S92 and the same processing is repeated. On the other hand, when the vertex has been dragged (YES at Step S93), the PC control unit 21 changes a coordinate of the vertex of the specified area (Step S94), and displays the positional information of each terminal and the changed specified area on the map of the display unit 24 (Step S95).

Then, the PC control unit 21 determines whether an end of the area specification is instructed (Step S96). When the end of the area specification is been instructed (NO at Step S96), process control returns to Step S92 and the same processing is repeated. On the other hand, when the end of the area specification is instructed (YES at Step S96), process control ends.

According to the fourth embodiment, the positional relation between the specified area and each terminal can be clearly displayed, so that the user can recognize the positional relation. While it is described in the fourth embodiment that the display screens shown in FIGS. 22 and 23 are displayed on the PC, it is possible to display the display screens on the display unit 94 of the marker. Furthermore, it is possible to receive operation for correcting the specified area by the marker. In this case, a user is allowed to perform the operation for correcting the specified area by using the operating unit 93 or other operating units (not shown) while looking at the positional relation displayed on the display unit 94 as shown in FIG. 21. Accordingly, the marker receives an instruction for correcting the specified area from the user and causes a correcting unit (not shown) to correct the specified area according to the instruction. If the display unit 94 is formed of a touch panel or the like, the user can perform the operation for correcting the specified area more easily.

Figure 25:
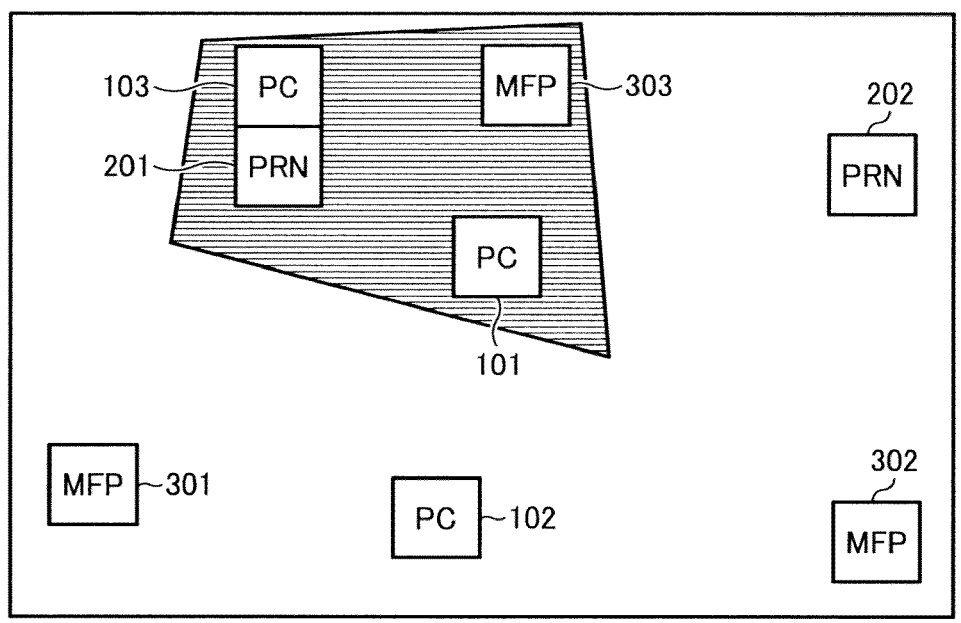
FIG. 25 is a schematic diagram of an exemplary display screen that displays a positional relation between a specified area and each terminal according to a fifth embodiment of the present invention.

In the fourth embodiment, the specified area itself is corrected. In contrast, in a fifth embodiment of the present invention, a position of a terminal can be moved for correction. More specifically, when a terminal correcting operation, such as a drag-and-drop of the MFP 303, on the display screen shown in FIG. 22 is received from a user, the MFP 303 is moved to a position within the specified area. Accordingly, the PC or the marker corrects the position of the terminal (a correcting unit). FIG. 25 illustrates an example of the display screen of the PC (or the marker) after the position of the terminal has been corrected. FIG. 25 is a schematic diagram of an exemplary display screen that displays a positional relation between the specified area and each terminal. A user is allowed to move the MFP 303 to a position displayed in FIG. 25 by looking at the display screen. The configurations of the fourth and the fifth embodiments can be combined with each other so that both the specified area and the position of the terminal can be corrected.

Figure 26:
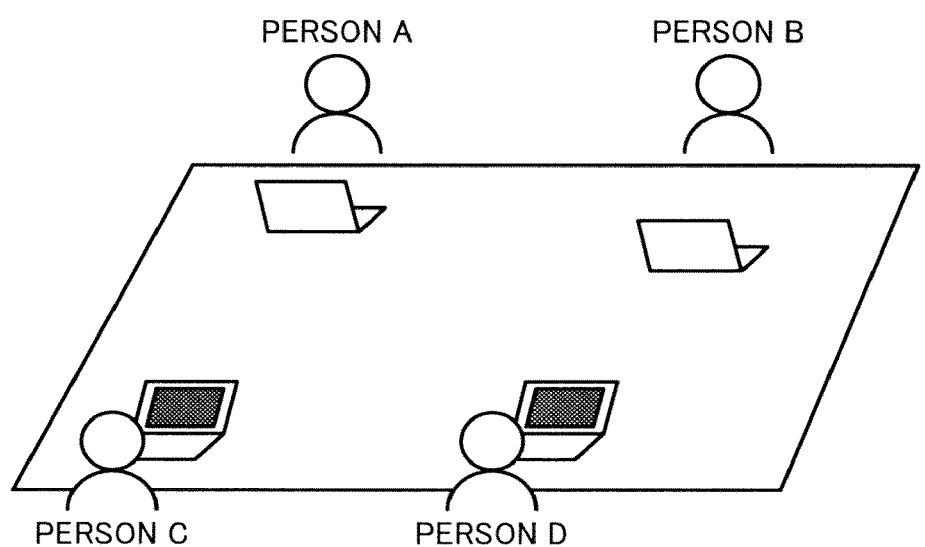
FIG. 26 is a schematic diagram for explaining an attribute relationship between terminals and users of the terminals according to a sixth embodiment of the present invention.
Figure 27:
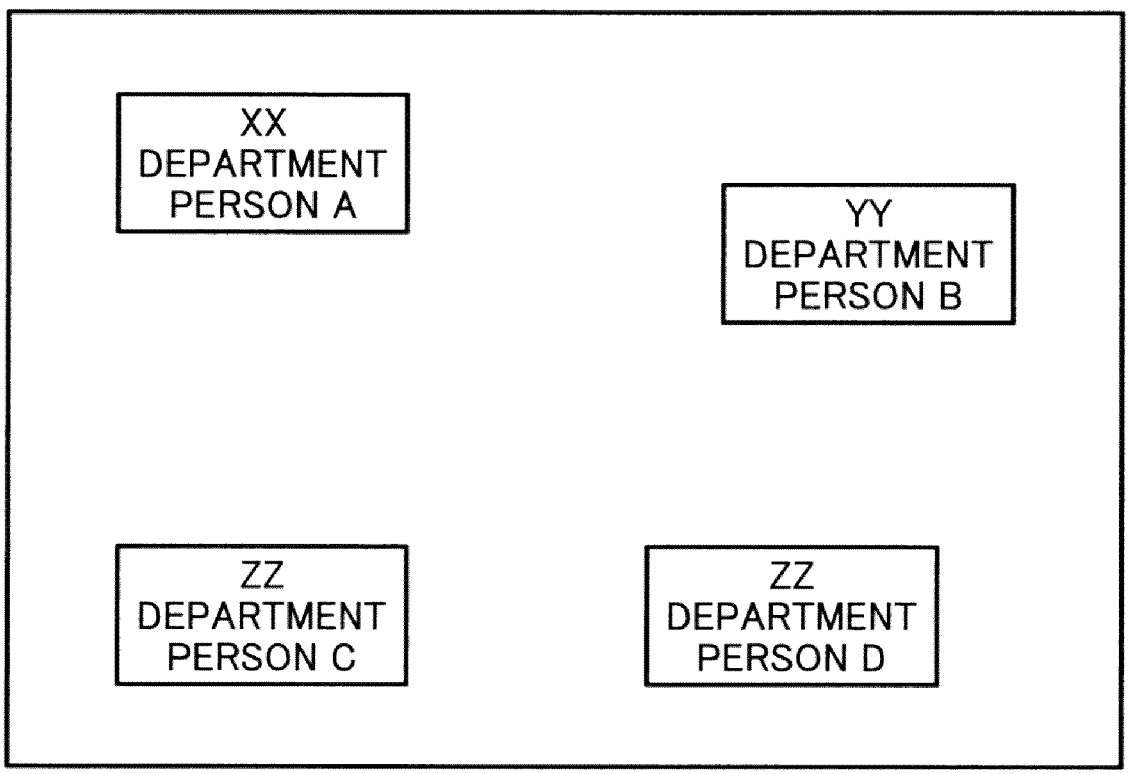
FIG. 27 is a schematic diagram of an exemplary display screen that displays a positional relation between a specified area and each terminal according to the sixth embodiment.

In the conventional technology disclosed in Japanese Patent Application Laid-open No. 2008-199422, when the display screens as shown in FIGS. 22, 23, and 25 are displayed on each terminal, only a type and a name of each terminal are displayed. However, only with such information, it is difficult to identify a user of each terminal. In a sixth embodiment of the present invention, when each person has a notebook PC (a terminal belonging to each person) as shown in FIG. 26, a position of each notebook PC is determined as a position of a user of each notebook PC and a determination result is displayed on the display screen of the PC (see FIG. 22) or the display unit 94 of the marker (see FIG. 21). In this case, it is assumed that attribute information containing a department or a name of the user is registered in advance when each terminal is registered. When the display screens as shown in FIGS. 22, 23, and 25 are displayed, the department and the name of the user (i.e., the attribute information) are displayed in association with each terminal as shown in FIG. 27.

When the attribute information is to be displayed on the display unit 94 of the marker, the marker needs to acquire the attribute information. The marker can acquire the attribute information by, for example, receiving the attribute information registered in each terminal through communication with each terminal. Furthermore, the marker can receive any attribute information that is desired to be displayed and manually input by the user. The acquired attribute information is stored in the table unit 64 in association with a corresponding other terminal position.

According to the sixth embodiment, a position of a terminal that belongs to a person is determined as a position of the person. Therefore, information about the person and the position of the person can be clearly displayed.

While the preferable embodiments of the present invention are described above, the present invention is not limited to the above embodiments. The present invention can be modified in various ways within a scope of the present invention.

The operation described in the above embodiments (i.e., the operation described with reference to flowcharts) can be implemented by hardware, software, and any combinations of the hardware and the software.

When processing is implemented by the software, it is possible to install a computer program containing a processing sequence in a memory of a computer that is built in a dedicated hardware so as to execute the computer program. It is also possible to install the computer program in a general computer that can execute various processing, and cause the computer to execute the computer programs.

The computer programs can be pre-stored in a storage medium such as a hard disk or a read only memory (ROM). The computer programs can be stored in a removable recording medium, such as a compact disk read only memory (CD-ROM), a magneto optical (MO) disk, a digital versatile disk (DVD), a magnetic disk, and a semiconductor memory, in a volatile or a nonvolatile manner. Such removable recording medium can be provided as general package software.

The computer programs can be transferred from a download site to a computer by radio, instead of the installation from the above-mentioned removable disk to the computer. The computer programs can also be transferred to the computer via a wired network such as the Internet. The computer can receive and install the transferred computer programs in a recording medium such as a built-in hard disk.

The processing operation described in the above embodiments can be performed in chronological order, in parallel, or individually, according to processing capacity of an apparatus that executes the processing or according to need.

The system described in the above embodiments can be modified to be a logical set of a plurality of apparatuses, or a combination of any functions of a plurality of apparatuses.

According to one aspect of the present invention, an area specifying apparatus that specifies a physical area can reduce an installation space and manufacturing costs thereof.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An area specifying apparatus that is portable, the area specifying apparatus comprising:
    a position acquiring unit that acquires positions of respective radio communication apparatuses through radio communication therewith;
    a distance measuring unit that measures distances from the area specifying apparatus to the respective radio communication apparatuses while the area specifying apparatus is being moved;
    a position calculating unit that calculates positions of the area specifying apparatus based on three or more of the positions of the respective radio communication apparatuses and corresponding three or more of the distances from the area specifying apparatus to the respective radio communication apparatuses; and
    a position transmitting unit that transmits the positions of the area specifying apparatus to each of the radio communication apparatuses so that each of the radio communication apparatuses specifies a physical area enclosed by a line connecting the positions of the area specifying apparatus as a specified area.

2. The area specifying apparatus according to claim 1, wherein
    the position calculating unit calculates two positions of the area specifying apparatus, and
    the position transmitting unit transmits the two positions to each of the radio communication apparatuses.

3. The area specifying apparatus according to claim 1, wherein the position calculating unit calculates positions of the area specifying apparatus, the positions each containing a coordinate of a two-dimensional position of the area specifying apparatus as well as an upper limit value and a lower limit value of a height of the area specifying apparatus in three-dimensional space.

4. The area specifying apparatus according to claim 1, further comprising a display unit that displays a positional relation between the specified area and each of the radio communication apparatuses located within or around the specified area.

5. The area specifying apparatus according to claim 4, further comprising a correcting unit that receives an instruction for correcting at least one of a size of the specified area and a position of any one of the radio communication apparatuses on the display unit, and corrects the specified area according to the instruction.

6. The area specifying apparatus according to claim 4, wherein the display unit displays attribute information of each of the radio communication apparatuses in association with corresponding one of the radio communication apparatuses, the attribute information being registered in advance.

7. The area specifying apparatus according to claim 1, further comprising an area specifying unit that specifies a physical area enclosed by a line connecting the positions of the area specifying apparatus as a specified area.

8. The area specifying apparatus according to claim 7, further comprising:
    an area in-or-out determining unit that determines whether each of the radio communication apparatuses is within or out of the specified area based on the positions of the area specifying unit; and
    a determination-result transmitting unit that transmits a determination result obtained by the area in-or-out determining unit to each of the radio communication apparatuses.

9. A communication system comprising:
    an area specifying apparatus that is portable; and
    a plurality of radio communication apparatuses each capable of communicating with the area specifying apparatus, wherein the area specifying apparatus includes
a position acquiring unit that acquires positions of respective radio communication apparatuses through radio communication therewith;
a distance measuring unit that measures distances to the respective radio communication apparatuses while the area specifying apparatus is being moved;
a position calculating unit that calculates positions of the area specifying apparatus based on three or more of the positions of the respective radio communication apparatuses and corresponding three or more distances from the area specifying apparatus to the respective radio communication apparatuses; and
a position transmitting unit that transmits the positions of the area specifying apparatus to each of the radio communication apparatuses, and
each of the radio communication apparatuses includes
an area specifying unit that receives the positions of the area specifying apparatus and specifies a physical area enclosed by a line connecting the positions of the area specifying apparatus as a specified area.

10. The communication system according to claim 9, wherein
the position calculating unit calculates two positions of the area specifying apparatus,
the position transmitting unit transmits the two positions to each of the radio communication apparatuses, and
the area specifying unit receives the two positions of the area specifying apparatus and specifies a polygonal area having a diagonal connecting the two positions of the area specifying apparatus as the specified area.

11. The communication system according to claim 9, wherein
the position calculating unit calculates positions of the area specifying apparatus, the positions each containing a coordinate of a two-dimensional position of the area specifying apparatus as well as an upper limit value and a lower limit value of a height of the area specifying apparatus in three-dimensional space, and
the area specifying unit receives the positions of the area specifying apparatus and specifies, as the specified area, a three dimensional space based on the coordinate, the upper limit value, and the lower limit value contained in each of the positions of the area specifying apparatus.

12. The communication system according to claim 9, wherein
the area specifying apparatus further has
a display unit that displays a positional relation between the specified area and each of the radio communication apparatuses located within or around the specified area.

13. The communication system according to claim 12, wherein
the area specifying apparatus further has
a correcting unit that receives an instruction for correcting at least one of a size of the specified area and a position of any one of the radio communication apparatuses on the display unit, and corrects the specified area according to the instruction.

14. The communication system according to claim 12, wherein
the display unit displays attribute information of each of the radio communication apparatuses in association with corresponding one of the radio communication apparatuses, the attribute information being registered in advance.

15. The communication system according to claim 9, wherein
each of the radio communication apparatuses further includes a storage unit that stores therein correspondence between the specified area and either a communication allowed area in which communication is allowed or a communication prohibited area in which communication is prohibited.

16. An area specifying method for an area specifying apparatus that is portable, the method comprising:
acquiring positions of respective radio communication apparatuses through radio communication therewith;
measuring distances from the area specifying apparatus to the respective radio communication apparatuses while the area specifying apparatus is being moved;
calculating positions of the area specifying apparatus based on three or more of the positions of the respective radio communication apparatuses and corresponding three or more of the distances from the area specifying apparatus to the respective radio communication apparatuses; and
transmitting the positions of the area specifying apparatus to each of the radio communication apparatuses so that each of the radio communication apparatuses specifies a physical area enclosed by a line connecting the positions of the area specifying apparatus as a specified area.

* * * * *